US 9,325,446 B2

(12) United States Patent
Sambo et al.

(10) Patent No.: US 9,325,446 B2
(45) Date of Patent: Apr. 26, 2016

(54) METHOD OF CONFIGURING AN OPTICAL PATH, A PATH COMPUTATION ENGINE AND AN OPTICAL COMMUNICATIONS NETWORK NODE

(75) Inventors: Nicola Sambo, Leghorn (IT); Giulio Bottari, Leghorn (IT); Piero Castoldi, Vicopisano (IT); Filippo Cugini, Fidenza (IT); Paola Iovanna, Rome (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 265 days.

(21) Appl. No.: 13/983,058

(22) PCT Filed: Mar. 21, 2011

(86) PCT No.: PCT/EP2011/054229
§ 371 (c)(1),
(2), (4) Date: Nov. 7, 2013

(87) PCT Pub. No.: WO2012/103962
PCT Pub. Date: Aug. 9, 2012

(65) Prior Publication Data
US 2014/0093246 A1      Apr. 3, 2014

(30) Foreign Application Priority Data
Feb. 4, 2011   (EP) .................................. 11153323

(51) Int. Cl.
*H04J 14/00*   (2006.01)
*H04J 14/02*   (2006.01)

(52) U.S. Cl.
CPC ......... *H04J 14/0201* (2013.01); *H04J 14/0227* (2013.01); *H04J 14/0257* (2013.01); *H04J 14/0258* (2013.01); *H04J 14/0267* (2013.01); *H04J 14/021* (2013.01)

(58) Field of Classification Search
None
See application file for complete search history.

(56) References Cited

U.S. PATENT DOCUMENTS

| 7,099,578    | B1 * | 8/2006  | Gerstel ............................ 398/5 |
| 7,120,118    | B2 * | 10/2006 | Rajagopal ........... H04L 12/2602 370/216 |
| 2001/0026384 | A1 * | 10/2001 | Sakano ................ H04B 10/032 398/79 |
| 2003/0099014 | A1 * | 5/2003  | Egner et al. ................... 359/124 |

(Continued)

OTHER PUBLICATIONS

Sivalingam et al., Optical WDM Networks: Principles and Practice, 2002, Kluwer Academic Publishers, pp. 262-263.*

(Continued)

*Primary Examiner* — Ken N Vanderpuye
*Assistant Examiner* — Jai Lee
(74) *Attorney, Agent, or Firm* — Nicholson De Vos Webster & Elliott, LLP

(57) ABSTRACT

A method of configuring an optical path, comprising: selecting a path from a first to a second node in an optical communications network; identifying each wavelength that may be used continuously across the path and selecting a transmission wavelength for the optical path one of the identified wavelengths for which: a fixed wavelength direction-bound add/drop transponder add operable at said wavelength is available at each node; if that first requirement is not met, a fixed wavelength direction-bound add/drop transponder or a fixed wavelength directionless add/drop transponder operable at said wavelength is available at each node; and if that second requirement is not met, a tunable wavelength direction-bound add/drop transponder or a tunable wavelength directionless add/drop transponder operable at said wavelength is available at each node.

16 Claims, 16 Drawing Sheets

(56) References Cited

U.S. PATENT DOCUMENTS

| | | | |
|---|---|---|---|
| 2003/0156840 A1* | 8/2003 | Uchikata | H04J 14/0297 398/7 |
| 2004/0208549 A1* | 10/2004 | Rutledge | H04J 14/0227 398/50 |
| 2010/0272441 A1* | 10/2010 | Boduch et al. | 398/83 |
| 2011/0262142 A1* | 10/2011 | Archambault | H04J 14/02 398/83 |
| 2012/0163814 A1* | 6/2012 | Zhao | 398/49 |
| 2013/0216226 A1* | 8/2013 | Hirano et al. | 398/51 |

OTHER PUBLICATIONS

Manousakis et al., Performance Evaluation of Node Architectures with Color and Direction Constraints in WDM Networks, 2010, IEEE.*

International Search Report, Application No. PCT/EP2011/054229, dated Oct. 11, 2011, 3 pages.

Konstantinos Manousakis et al., "Performance Evaluation of Node Architectures with Color and Direction Constraints in WDM Networks," Dec. 6, 2010, 6 pages, IEEE.

Y. Lee et al., "Framework for GMPLS and PCE Control of Wavelength Switched Optical Networks (WSON); draft-ietf-ccamp-rwa-wson-framework-10.txt," Jan. 10, 2011, 53 pages, Network Working Group, Internet Draft, IETF Trust.

D. Li et al., "Evaluation of Possible Interior Gateway Protocol Extensions for Wavelength Switching Optical Networks; draft-li-ccamp-wson-igp-eval-01.txt," Jul. 11, 2008, 16 pages, Network Work Group, Internet Draft, IETF Trust.

Y. Lee et al., "Routing and Wavelength Assignment Information Model for Wavelength Switched Optical Networks; draft-ietf-ccamp-rwa-info-09.txt," Sep. 3, 2010, 26 pages, Network Working Group, Internet Draft, IETF Trust.

Written Opinion of the International Searching Authority, Application No. PCT/EP2011/054229, dated Oct. 11, 2011, 4 pages.

International Preliminary Report on Patentability (Chapter I), Application No. PCT/EP2011/054229, dated Aug. 15, 2013, 6 pages.

\* cited by examiner

METHOD OF CONFIGURING AN OPTICAL PATH, A PATH COMPUTATION ENGINE AND AN OPTICAL COMMUNICATIONS NETWORK NODE

CROSS-REFERENCE TO RELATED APPLICATIONS

This application is a National stage of International Application No. PCT/EP2011/054229, filed Mar. 21, 2011, which claims priority to EP Application No. 11153323.8, filed Feb. 4, 2011, which are hereby incorporated by reference in their entirety.

TECHNICAL FIELD

The invention relates to a method of configuring an optical path from a first node to a second node in an optical communications network, a path computation engine of an optical communications network and an optical communications network node.

BACKGROUND

Wavelength Selective Switch (WSS) technology has recently enabled the introduction of multi-degree Reconfigurable Optical Add Drop Multiplexers (ROADM) and the deployment of cost-effective dynamic Wavelength Switched Optical Networks (WSONs). Several WSS-based ROADM structures have been proposed which differ in the way which add/drop functionalities are implemented, that is to say in the number of WSSs that they utilise. For example, a simple ROADM structure comprising no WSS guarantees low cost but imposes wavelength and directional constraints to each add/drop, having tributaries at fixed wavelengths and of fixed direction. More expensive ROADM structures, adopting one or two WSS per add/drop enables the add/drops to have tunable wavelength and/or configurable direction. The most commonly used ROADM structures comprise many add/drops of fixed wavelength and direction and a limited percentage of add/drops of partially or fully flexible wavelength and direction. The internet engineering taskforce, IETF, has proposed routing protocol extensions to describe internal ROADM structures in Y. Lee et al, "Routing and Wavelength Assignment Information Model for Wavelength Switched Optical Networks", IETF draft, draft-ietf-ccamp-rwa-info-09, September 2010.

In the planning phase of configuring a communications network, where the hardware is defined to support a given traffic matrix, the real ROADM constraints are typically taken into account. The planning engine has complete knowledge of the configuration rules and limitations of the hardware and performs path computation taking all this information into account. In the case of dynamic lightpath setup, known methods of path computation commonly assume the use of ROADMs which have no wavelength or directional constraints, without accounting for node limitations. In a dynamic communications network, if node constraints are not considered during path computation and wavelength assignment, lightpath setup can easily be blocked and node resources are not properly exploited.

SUMMARY

It is an object to provide an improved method of configuring an optical path from a first node to a second node in an optical communications network. It is a further object to provide an improved path computation engine of an optical communications network. It is a further object to provide an improved optical communications network node.

A first aspect of the invention provides a method of configuring an optical path from a first node to a second node in an optical communications network. Each node comprises a plurality of add/drop transponders comprising at least two of a fixed wavelength direction-bound add/drop transponder, a fixed wavelength directionless add/drop transponder, a tunable wavelength direction-bound add/drop transponder, and a tunable wavelength directionless add/drop transponder, the add/drop transponders each comprising an add and a drop. The method comprises selecting a path from the first node to the second node, identifying each wavelength that may be used continuously across said path, and selecting a transmission wavelength for the optical path. The method comprises selecting as the transmission wavelength for said optical path a said wavelength which meets a first wavelength requirement. The first wavelength requirement requires that a fixed wavelength direction-bound add/drop transponder add operable at said wavelength is available at each of the first node and the second node. The method further comprises, if the first wavelength requirement is not met, selecting as the transmission wavelength a said wavelength which meets a second wavelength requirement. The second wavelength requirement requires that one of a fixed wavelength direction-bound add/drop transponder and a fixed wavelength directionless add/drop transponder operable at said wavelength is available at each of the first node and the second node. The method further comprises, if the second wavelength requirement is not met, selecting as the transmission wavelength a said wavelength for which one of a tunable wavelength direction-bound add/drop transponder and a tunable wavelength directionless add/drop transponder operable at said wavelength is available at each of the first node and the second node.

The method may enable an optical path to be configured using the least flexible add/drop transponder available, leaving more flexible ones for later use when resource constraints are tighter. The method may therefore enable proper exploitation of the resources at each node. The method may enable optical paths to be configured accounting for realistic constraints of the add/drop transponders at the end point nodes. The method may reduce the probability of configuration of an optical path being blocked due to the nodes at the ends of the path having add/drop transponders operable at incompatible wavelengths. The method may enable the wavelength compatibility of the add/drop transponders available at the end point nodes to be considered before the optical path is configured.

In an embodiment, the add/drop transponders are provided by at least one optical add/drop multiplexer. In an embodiment, the at least one optical add/drop multiplexer comprises a reconfigurable optical add/drop multiplexer. The method may enable optical paths to be configured accounting for real capabilities and constraints in reconfigurable optical add/drop multiplexers.

In an embodiment, said path is selected by:
a. obtaining a set of candidate paths from the first node to the second node. Each said candidate path comprises a plurality of links;
b. for each candidate path, identifying each add-drop pair comprising an add of a said add/drop transponder at said first node and a drop of a said add/drop transponder at said second node. Said add and said drop being operable at a shared wavelength; and
c. selecting said candidate path having the greatest number of said add-drop pairs.

In an embodiment, the method further comprises an initialising step comprising generating an open shortest path first traffic engineering, OSPF-TE, routing protocol signal. The OSPF-TE routing protocol signal comprises an indication of the number of add/drop transponders in the optical communications network. The OSPF-TE routing protocol signal further comprises an indication identifying each said add/drop transponder as one of a fixed wavelength direction-bound add/drop transponder, a fixed wavelength directionless add/drop transponder, a tunable wavelength direction-bound add/drop transponder, and a tunable wavelength directionless add/drop transponder. The method further comprises advertising said routing protocol signal across the optical communications network. Add/drop transponder capacity may therefore be efficiently flooded across the network. The method may therefore be used to dynamically configure optical paths in an optical network in which add/drop transponder capacity is changed.

In an embodiment, the method further comprises obtaining an availability of each add and drop of each said add/drop transponder. Step b. comprises identifying each add-drop pair comprising an add of a said add/drop transponder at said first node and a drop of a said add/drop transponder at said second node. Said add and said drop being operable at a shared wavelength and being available for use at said shared wavelength. The method may therefore be used to dynamically configure optical paths in an optical network in which add/drop transponder availability changes.

In an embodiment, step b. comprises identifying each add-drop pair comprising an add of a said of a said fixed wavelength add/drop transponder at said first node and a drop of a said fixed wavelength add/drop transponder at said second node. Said add and said drop being arranged to operate at a shared wavelength. Step b. further comprises, if no said add-drop pair exists, identifying each add-drop pair comprising an add of a said tunable wavelength add/drop transponder at said first node and a drop of a said tunable wavelength add/drop transponder at said second node. The method may enable optical path configuration in which the least flexible add/drop transponder available are used first, leaving more flexible ones for later use when resource constraints are tighter. The method may therefore enable proper exploitation of the resources at each node.

In an embodiment, the OSPF-TE routing protocol signal further comprises an indication of an availability of the add and the drop of each add/drop transponder. Add/drop transponder availability may therefore be efficiently flooded across the network.

In an embodiment, the method further comprises obtaining a wavelength availability for each said link. Step b. comprises, for each candidate path:
identifying each add-drop pair which meets a first path requirement that said add-drop pair comprises an add of a said fixed wavelength add/drop transponder at said first node and a drop of a said fixed wavelength add/drop transponder at said second node. Said add and said drop being arranged to operate at a shared wavelength and the respective shared wavelength being available on each said link of said candidate path; and
if said first path requirement is not met by any said add-drop pair, determining whether said links of said candidate path share an available wavelength and if they do, identifying each add-drop pair which meets a second path requirement that said add-drop pair comprises an add of a said tunable wavelength direction-bound add/drop transponder at said first node and a drop of a said tunable wavelength direction-bound add/drop transponder at said second node.

The method may therefore apply a continuity constraint to the optical path being configured. Only add/drop transponder pairs for which the shared wavelength is available on all links of the path are identified for each candidate path. This may reduce the probability of the optical path being blocked due to a selected wavelength not being available across the full path.

In an embodiment, the OSPF-TE routing protocol signal further comprises an indication of a wavelength availability of each said link. Link wavelength availability may therefore be efficiently flooded across the network.

In an embodiment, if said second path requirement is not met by any said add-drop pair, step b. comprises, for each said candidate path, identifying each wavelength that may be used continuously across the path. Step c. comprises selecting the candidate path having the greatest number of said wavelengths.

In an embodiment, the wavelength availability of each link of the optical path is obtained by generating and transmitting a resource reservation protocol traffic engineering, RSVP-TE, signalling protocol signal comprising a label set across the optical path and updating the label set with the wavelength availability of each said link. This may enable the actual wavelength availability of each link along the selected optical path to be obtained.

In an embodiment, if an add of at least one of a tunable wavelength direction-bound add/drop transponder and a tunable wavelength directionless add/drop transponder is available at the first node the label set initially comprises all wavelengths available on a first link of the optical path from the first node and if a said add is not available, the label set initially comprises all wavelengths for which an add of one of a fixed wavelength direction-bound add/drop transponder and a fixed wavelength directionless add/drop transponder is available at the first node. The label set may therefore be initialised with only the wavelengths which are known to be available from the first node.

In an embodiment, the transmission wavelength for the path is selected using first-fit wavelength selection.

In an embodiment, the method further comprises reserving a drop of a said add/drop transponder at said second node operable at said transmission wavelength which meets a first drop requirement. The first drop requirement requires that said drop is a drop of a fixed wavelength direction-bound add/drop transponder. The method further comprises, if said first drop requirement is not met by any said drop at said second node, reserving a drop of a said add/drop transponder at said second node operable at said transmission wavelength which meets a second drop requirement. The second drop requirement requires that said drop is a drop of a fixed wavelength directionless add/drop transponder. The method further comprises, if said second drop requirement is not met by any said drop at said second node, reserving a drop of a said add/drop transponder at said second node operable at said transmission wavelength which meets a third drop requirement. The third drop requirement requires that said drop is a drop of a tunable wavelength direction-bound add/drop transponder. The method further comprises, if said third drop requirement is not met by any said drop at said second node, reserving a drop of a said add/drop transponder at said second node operable at said transmission wavelength which meets a fourth drop requirement. The fourth drop requirement requires that said drop is a drop of a tunable wavelength directionless add/drop transponder.

A drop may therefore be reserved in accordance with a preference ranking of add/drop transponder type, so that the node resources having the least wavelength and output direction flexibility are allocated first.

In an embodiment, the method further comprises selecting an add of a said add/drop transponder at said first node operable at said transmission wavelength.

In an embodiment, the method further comprises generating a control signal arranged to cause the first node to reserve the selected add.

In an embodiment, the method further comprises generating a control signal arranged to cause the first node to select an add at the selected transmission wavelength for the optical path and to reserve the selected add.

In an embodiment, the method comprises selecting said add at the first node by selecting an add of a said add/drop transponder at said first node operable at said transmission wavelength which meets a first add requirement. The first add requirement requires that said add is an add of a fixed wavelength direction-bound add/drop transponder. The method further comprises, if said first add requirement is not met by any said add at said first node, selecting an add of a said add/drop transponder at said first node operable at said transmission wavelength which meets a second add requirement. The second add requirement requires that said add is an add of a fixed wavelength directionless add/drop transponder. The method further comprises, if said second add requirement is not met by any said add at said first node, selecting an add of a said add/drop transponder at said first node operable at said transmission wavelength which meets a third add requirement. The third add requirement requires that said add is an add of a tunable wavelength direction-bound add/drop transponder. The method further comprises, if said third add requirement is not met by any said add at said first node, selecting an add of a said add/drop transponder at said first node operable at said transmission wavelength which meets a fourth add requirement. The fourth add requirement requires that said add is an add of a tunable wavelength directionless add/drop transponder.

An add may therefore be reserved in accordance with a preference ranking of add/drop transponder type, so that the node resources having the least wavelength and output direction flexibility are allocated first.

In an embodiment, the optical communications network comprises a wavelength switched optical network. The method may therefore be used to configure bi-directional optical paths across a network.

A second aspect of the invention provides a path computation engine of an optical communications network. The path computation engine is arranged to configure an optical path from a first node to a second node in an optical communications network. Each node comprises a plurality of add/drop transponders comprising at least two of a fixed wavelength direction-bound add/drop transponder, a fixed wavelength directionless add/drop transponder, a tunable wavelength direction-bound add/drop transponder, and a tunable wavelength directionless add/drop transponder, the add/drop transponders each comprising an add and a drop. The path computation engine is arranged to select a path from the first node to the second node, identify each wavelength that may be used continuously across said path, and select a transmission wavelength for the optical path. The path computation engine is arranged to select as the transmission wavelength for said optical path a said wavelength which meets a first wavelength requirement. The first wavelength requirement requires that a fixed wavelength direction-bound add/drop transponder operable at said wavelength is available at each of the first node and the second node. The path computation engine is arranged to, if the first wavelength requirement is not met, select as the transmission wavelength a said wavelength which meets a second wavelength requirement. The second wavelength requirement requires that one of a fixed wavelength direction-bound add/drop transponder and a fixed wavelength directionless add/drop transponder operable at said wavelength is available at each of the first node and the second node. The path computation engine is arranged to, if the second wavelength requirement is not met, select as the transmission wavelength a said wavelength for which one of a tunable wavelength direction-bound add/drop transponder and a tunable wavelength directionless add/drop transponder operable at said wavelength is available at each of the first node and the second node.

The path computation engine, PCE, may therefore be used to configure an optical path using the least flexible add/drop transponder available, leaving more flexible ones for later use when resource constraints are tighter. Use of the PCE may enable proper exploitation of the resources at each node. Use of the PCE may enable optical paths to be configured accounting for realistic constraints of the add/drop transponders at the end point nodes. Use of the PCE may reduce the probability of configuration of an optical path being blocked due to the nodes at the ends of the path having add/drop transponders operable at incompatible wavelengths. Use of the PCE may enable the wavelength compatibility of the add/drop transponders available at the end point nodes to be considered before the optical path is configured.

In an embodiment, the add/drop transponders are provided by at least one optical add/drop multiplexer. In an embodiment, the at least one optical add/drop multiplexer comprises a reconfigurable optical add/drop multiplexer. The PCE may be used to enable optical paths to be configured accounting for real capabilities and constraints in reconfigurable optical add/drop multiplexers.

The path computation engine comprises a controller arranged to select the path from the first node to the second node, identify each wavelength that may be used continuously across said path, and select the transmission wavelength for the optical path.

In an embodiment, the path computation engine is arranged to select the path by:
a. obtaining a set of candidate paths from the first node to the second node. Each said candidate path comprises a plurality of links;
b. for each candidate path, identifying each add-drop pair comprising an add of a said add/drop transponder at said first node and a drop of a said add/drop transponder at said second node. Said add and said drop being operable at a shared wavelength; and
c. selecting said candidate path having the greatest number of said add-drop pairs.

In an embodiment, the path computation engine is further arranged to receive an open shortest path first traffic engineering, OSPF-TE, routing protocol signal. The OSPF-TE routing protocol signal comprises an indication of the number of add/drop transponders in the optical communications network. The OSPF-TE routing protocol signal further comprises an indication identifying each said add/drop transponder as one of a fixed wavelength direction-bound add/drop transponder, a fixed wavelength directionless add/drop transponder, a tunable wavelength direction-bound add/drop transponder, and a tunable wavelength directionless add/drop transponder. The PCE may therefore receive add/drop transponder capacity information, enabling the PCE to be used to dynamically configure optical paths in an optical network in which add/drop transponder capacity is changed.

In an embodiment, the path computation engine is further arranged to obtain an availability of each add and drop of each said add/drop transponder. Step b. comprises identifying each add-drop pair comprising an add of a said add/drop transponder at said first node and a drop of a said add/drop transponder at said second node. Said add and said drop being operable at a shared wavelength and being available for use at said shared wavelength. The PCE may therefore be used to dynamically configure optical paths in an optical network in which add/drop transponder availability changes.

In an embodiment, step b. comprises comprises identifying each add-drop pair comprising an add of a said fixed wavelength add/drop transponder at said first node and a drop of a said fixed wavelength add/drop transponder at said second node. Said add and said drop being arranged to operate at a shared wavelength. Step b. further comprises, if no said add-drop pair exists, identifying each add-drop pair comprising an add of a said tunable wavelength add/drop transponder at said first node and a drop of a said tunable wavelength add/drop transponder at said second node. The PCE may thus be used to enable optical path configuration in which the least flexible add/drop transponder available are used first, leaving more flexible ones for later use when resource constraints are tighter. The PCE may therefore enable proper exploitation of the resources at each node.

In an embodiment, the OSPF-TE routing protocol signal further comprises an indication of an availability of the add and the drop of each add/drop transponder.

In an embodiment, the path computation engine is further arranged to obtain a wavelength availability for each said link. Step b. comprises, for each candidate path:
 identifying each add-drop pair which meets a first path requirement that said add-drop pair comprises an add of a said fixed wavelength add/drop transponder at said first node and a drop of a said fixed wavelength add/drop transponder at said second node. Said add and said drop being arranged to operate at a shared wavelength and the respective shared wavelength being available on each said link of said candidate path; and
 if said first path requirement is not met by any said add-drop pair, determining whether said links of said candidate path share an available wavelength and if they do, identifying each add-drop pair which meets a second path requirement that said add-drop pair comprises an add of a said tunable wavelength direction-bound add/drop transponder at said first node and a drop of a said tunable wavelength direction-bound add/drop transponder at said second node.

In an embodiment, the OSPF-TE routing protocol signal further comprises an indication of a wavelength availability of each said link. The PCE may therefore apply a continuity constraint during configuration of the optical path. Only add/drop transponder pairs for which the shared wavelength is available on all links of the path are identified for each candidate path. This may reduce the probability of the optical path being blocked due to a selected wavelength not being available across the full path.

In an embodiment, if said second path requirement is not met by any said add-drop pair, step b. comprises, for each said candidate path, identifying each wavelength that may be used continuously across the path. Step c. comprises selecting the candidate path having the greatest number of said wavelengths.

In an embodiment, the path computation engine is arranged to obtain a wavelength availability of each link of the optical path by generating a resource reservation protocol traffic engineering, RSVP-TE, signalling protocol signal comprising a label set for transmission across the optical path, the label set being arranged to be updated with the wavelength availability of each said link during propagation across the path. This may enable the actual wavelength availability of each link along the selected optical path to be obtained.

In an embodiment, if an add of at least one of a tunable wavelength direction-bound add/drop transponder and a tunable wavelength directionless add/drop transponder is available at the first node the label set initially comprises all wavelengths available on a first link of the optical path from the first node and if a said add is not available, the label set initially comprises all wavelengths for which an add of one of a fixed wavelength direction-bound add/drop transponder and a fixed wavelength directionless add/drop transponder is available at the first node. The label set may therefore be initialised with only the wavelengths which are known to be available from the first node.

In an embodiment, the path computation engine is further arranged to select the transmission wavelength for the path using first-fit wavelength selection.

In an embodiment, the path computation engine is further arranged to generate a reservation signal arranged to reserve a drop of a said add/drop transponder at said second node operable at said transmission wavelength which meets a first drop requirement. The first drop requirement requires that said drop is a drop of a fixed wavelength direction-bound add/drop transponder. The path computation engine is further arranged to, if said first drop requirement is not met by any said drop at said second node, generate a reservation signal arranged to reserve a drop of a said add/drop transponder at said second node operable at said transmission wavelength which meets a second drop requirement. The second drop requirement requires that said drop is a drop of a fixed wavelength directionless add/drop transponder. The path computation engine is further arranged to, if said second drop requirement is not met by any said drop at said second node, generate a reservation signal arranged to reserve a drop of a said add/drop transponder at said second node operable at said transmission wavelength which meets a third drop requirement. The third drop requirement requires that said drop is a drop of a tunable wavelength direction-bound add/drop transponder. The path computation engine is further arranged to, if said third drop requirement is not met by any said drop at said second node, generate a reservation signal arranged to reserve a drop of a said add/drop transponder at said second node operable at said transmission wavelength which meets a fourth drop requirement. The fourth drop requirement requires that said drop is a drop of a tunable wavelength directionless add/drop transponder.

A drop may therefore be reserved in accordance with a preference ranking of add/drop transponder type, so that the node resources having the least wavelength and output direction flexibility are allocated first.

In an embodiment, the path computation engine is further arranged to select an add of a said add/drop transponder at said first node operable at said transmission wavelength.

In an embodiment, the path computation engine is further arranged to generate a control signal arranged to cause the first node to reserve the selected add.

In an embodiment, the path computation engine is further arranged to generate a control signal arranged to cause the first node to select an add at the selected transmission wavelength for the optical path and to reserve the selected add.

In an embodiment, the path computation engine is further arranged to select said add at the first node by selecting an add of a said add/drop transponder at said first node operable at said transmission wavelength which meets a first add requirement. The first add requirement requires that said add is an add of a fixed wavelength direction-bound add/drop transponder. The path computation engine is further arranged to, if said first add requirement is not met by any said add at said first node, reserve an add of a said add/drop transponder at said first node operable at said transmission wavelength which meets a second add requirement. The second add requirement requires that said add is an add of a fixed wavelength directionless add/drop transponder. The path computation engine is further arranged to, if said second add requirement is not met by any said add at said first node, reserve an add of a said add/drop transponder at said first node operable at said transmission wavelength which meets a third add requirement. The third add requirement requires that said add is an add of a tunable wavelength direction-bound add/drop transponder. The path computation engine is further arranged to, if said third add requirement is not met by any said add at said first node, reserve an add of a said add/drop transponder at said first node operable at said transmission wavelength which meets a fourth add requirement. The fourth add requirement requires that said add is an add of a tunable wavelength directionless add/drop transponder.

An add may therefore be reserved in accordance with a preference ranking of add/drop transponder type, so that the node resources having the least wavelength and output direction flexibility are allocated first.

In an embodiment, the optical communications network comprises a wavelength switched optical network. The PCE may therefore be used to configure bi-directional optical paths across a network.

A third aspect of the invention provides an optical communications network node comprising a plurality of add/drop transponders and a controller. Said plurality of add/drop transponders comprises at least two of a fixed wavelength direction-bound add/drop transponder, a fixed wavelength directionless add/drop transponder, a tunable wavelength direction-bound add/drop transponder, and a tunable wavelength directionless add/drop transponder, the add/drop transponders each comprising an add and a drop. The controller is arranged to select a path across an optical communications network from said node to a second node. The second node comprises a plurality of add/drop transponders comprising at least two of a fixed wavelength direction-bound add/drop transponder, a fixed wavelength directionless add/drop transponder, a tunable wavelength direction-bound add/drop transponder, and a tunable wavelength directionless add/drop transponder, the add/drop transponders each comprising an add and a drop. The controller is further arranged to identify each wavelength that may be used continuously across said path. The controller is arranged to select as the transmission wavelength for said optical path a said wavelength which meets a first wavelength requirement. The first wavelength requirement requires that a fixed wavelength direction-bound add/drop transponder operable at said wavelength is available at each of the first node and the second node. The controller is arranged to, if the first wavelength requirement is not met, select as the transmission wavelength a said wavelength which meets a second wavelength requirement. The second wavelength requirement requires that one of a fixed wavelength direction-bound add/drop transponder and a fixed wavelength directionless add/drop transponder operable at said wavelength is available at each of the first node and the second node. The controller is arranged to, if the second wavelength requirement is not met, select as the transmission wavelength a said wavelength for which one of a tunable wavelength direction-bound add/drop transponder and a tunable wavelength directionless add/drop transponder operable at said wavelength is available at each of the first node and the second node.

The node may therefore be operated to configure an optical path using the least flexible add/drop transponder available, leaving more flexible ones for later use when resource constraints are tighter. The node may be operated to enable proper exploitation of its resources and those at the second node. The node may enable optical paths to be configured accounting for realistic constraints of its add/drop transponders and those at the second node. The node may therefore be operated to reduce the probability of configuration of an optical path being blocked due to the second node having add/drop transponders operable at wavelengths which are incompatible with those at which its own add/drop transponder are arranged to operate. The node may therefore be operated to enable the wavelength compatibility of the add/drop transponders available at the second node to be considered before the optical path is configured.

In an embodiment, the add/drop transponders are provided by at least one optical add/drop multiplexer. In an embodiment, the at least one optical add/drop multiplexer comprises a reconfigurable optical add/drop multiplexer. The node may therefore configure optical paths accounting for the real capabilities and constraints in its reconfigurable optical add/drop multiplexers and those of the second node.

In an embodiment, the controller is arranged to select the path by:
d. obtaining a set of candidate paths from the first node to the second node. Each said candidate path comprises a plurality of links;
e. for each candidate path, identifying each add-drop pair comprising an add of a said add/drop transponder at said first node and a drop of a said add/drop transponder at said second node. Said add and said drop being operable at a shared wavelength; and
f. selecting said candidate path having the greatest number of said add-drop pairs.

In an embodiment, the controller is further arranged to receive an open shortest path first traffic engineering, OSPF-TE, routing protocol signal. The OSPF-TE routing protocol signal comprises an indication of the number of add/drop transponders in the optical communications network. The OSPF-TE routing protocol signal further comprises an indication identifying each said add/drop transponder as one of a fixed wavelength direction-bound add/drop transponder, a fixed wavelength directionless add/drop transponder, a tunable wavelength direction-bound add/drop transponder, and a tunable wavelength directionless add/drop transponder. The node may therefore receive add/drop transponder capacity information of the second node, enabling the node to dynamically configure optical paths in an optical network in which the add/drop transponder capacity of other nodes is changed.

In an embodiment, the controller is further arranged to obtain an availability of each add and drop of each said add/drop transponder. Step b. comprises identifying each add-drop pair comprising an add of a said add/drop transponder at said first node and a drop of a said add/drop transponder at said second node. Said add and said drop being operable at a shared wavelength and being available for use at said shared wavelength. The node may therefore dynamically configure optical paths in an optical network in which add/drop transponder availability changes.

In an embodiment, step b. comprises identifying each add-drop pair comprising an add of a said add/drop transponder of a said fixed wavelength type at said first node and a drop of a said add/drop transponder of a said fixed wavelength type at said second node. Said add and said drop being arranged to operate at a shared wavelength. Step b. further comprises, if no said add-drop pair exists, identifying each add-drop pair comprising an add of a said add/drop transponder of a said tunable wavelength type at said first node and a drop of a said add/drop transponder of a said tunable wavelength type at said second node. The node may therefore configure an optical path for which the least flexible add/drop transponders available are used first, leaving more flexible ones for later use when resource constraints are tighter. The node may therefore enable proper exploitation of its resources and those at the second node.

In an embodiment, the OSPF-TE routing protocol signal further comprises an indication of an availability of the add and the drop of each add/drop transponder.

In an embodiment, the controller is further arranged to obtain a wavelength availability for each said link. Step b. comprises, for each candidate path:

identifying each add-drop pair which meets a first path requirement that said add-drop pair comprises an add of a said add/drop transponder of a said fixed wavelength type at said first node and a drop of a said add/drop transponder of a said fixed wavelength type at said second node. Said add and said drop being arranged to operate at a shared wavelength and the respective shared wavelength being available on each said link of said candidate path; and if said first path requirement is not met by any said add-drop pair, determining whether said links of said candidate path share an available wavelength and if they do, identifying each add-drop pair which meets a second path requirement that said add-drop pair comprises an add of a said add/drop transponder said tunable wavelength direction-bound type at said first node and a drop of a said add/drop transponder of a said tunable wavelength direction-bound at said second node.

In an embodiment, the OSPF-TE routing protocol signal further comprises an indication of a wavelength availability of each said link. The node may therefore apply a continuity constraint during configuration of the optical path. Only add/drop transponder pairs for which the shared wavelength is available on all links of the path are identified for each candidate path. This may reduce the probability of the optical path being blocked due to a selected wavelength not being available across the full path.

In an embodiment, if said second path requirement is not met by any said add-drop pair, step b. comprises, for each said candidate path, identifying each wavelength that may be used continuously across the path. Step c. comprises selecting the candidate path having the greatest number of said wavelengths.

In an embodiment, the node is arranged to obtain a wavelength availability of each link of the optical path by generating and transmitting a resource reservation protocol traffic engineering, RSVP-TE, signalling protocol signal comprising a label set across the optical path, the label set being arranged to be updated with the wavelength availability of each said link during propagation across the path. This may enable the actual wavelength availability of each link along the selected optical path to be obtained.

In an embodiment, if an add of at least one of a tunable wavelength direction-bound add/drop transponder and a tunable wavelength directionless add/drop transponder is available at the node the label set initially comprises all wavelengths available on a first link of the optical path from the node and if a said add is not available, the label set initially comprises all wavelengths for which an add of one of a fixed wavelength direction-bound add/drop transponder and a fixed wavelength directionless add/drop transponder is available at the node. The label set may therefore be initialised with only the wavelengths which are known to be available from the node.

In an embodiment, the controller is further arranged to select the transmission wavelength for the path using first-fit wavelength selection.

In an embodiment, the controller is further arranged to generate a reservation signal arranged to reserve a drop of a said add/drop transponder at said second node operable at said transmission wavelength which meets a first drop requirement. The first drop requirement requires that said drop is a drop of a fixed wavelength direction-bound add/drop transponder. The controller is further arranged to, if said first drop requirement is not met by any said drop at said second node, generate a reservation signal arranged to reserve a drop of a said add/drop transponder at said second node operable at said transmission wavelength which meets a second drop requirement. The second drop requirement requires that said drop is a drop of a fixed wavelength directionless add/drop transponder. The controller is further arranged to, if said second drop requirement is not met by any said drop at said second node, generate a reservation signal arranged to reserve a drop of a said add/drop transponder at said second node operable at said transmission wavelength which meets a third drop requirement. The third drop requirement requires that said drop is a drop of a tunable wavelength direction-bound add/drop transponder. The controller is further arranged to, if said third drop requirement is not met by any said drop at said second node, generate a reservation signal arranged to reserve a drop of a said add/drop transponder at said second node operable at said transmission wavelength which meets a fourth drop requirement. The fourth drop requirement requires that said drop is a drop of a tunable wavelength directionless add/drop transponder.

The node may therefore reserve a drop at the second node in accordance with a preference ranking of add/drop transponder type, so that the resources at the second node having the least wavelength and output direction flexibility are allocated first.

In an embodiment, the controller is further arranged to select an add of a said add/drop transponder at said first node operable at said transmission wavelength.

In an embodiment, the path computation engine is further arranged to generate a control signal arranged to cause the first node to reserve the selected add.

In an embodiment, the controller is further arranged to generate a control signal arranged to cause the first node to reserve an add at the selected transmission wavelength for the optical path.

In an embodiment, the controller is further arranged to reserve said add at the first node by selecting an add of a said add/drop transponder at said first node operable at said transmission wavelength which meets a first add requirement. The first add requirement requires that said add is an add of a fixed wavelength direction-bound add/drop transponder. The controller is further arranged to, if said first add requirement is not met by any said add at said first node, reserve an add of a said add/drop transponder at said first node operable at said transmission wavelength which meets a second add requirement. The second add requirement requires that said add is an add of a fixed wavelength directionless add/drop transponder. The controller is further arranged to, if said second add requirement is not met by any said add at said first node, reserve an add of a said add/drop transponder at said first node operable at said transmission wavelength which meets a third add requirement. The third add requirement requires that said add is an add of a tunable wavelength direction-bound add/drop transponder. The controller is further arranged to, if said third add requirement is not met by any said add at said first node, reserve an add of a said add/drop transponder at said first node operable at said transmission wavelength which meets a fourth add requirement. The fourth add requirement requires that said add is an add of a tunable wavelength directionless add/drop transponder.

The node may therefore reserve one of its adds in accordance with a preference ranking of add/drop transponder type, so that its resources having the least wavelength and output direction flexibility are allocated first.

In an embodiment, the optical communications network comprises a wavelength switched optical network.

A fourth aspect of the invention provides a data carrier having computer readable instructions embodied therein. The said computer readable instructions are for providing access to resources available on a processor. The computer readable instructions comprise instructions to cause the processor to perform any of the above steps of the method of configuring an optical path from a first node to a second node in an optical communications network.

Embodiments of the invention will now be described, by way of example only, with reference to the accompanying drawings.

DETAILED DESCRIPTION

A first embodiment of the invention provides a method 10 of configuring an optical path from a first node to a second node in an optical communications network. Each node comprises a plurality of add/drop transponders comprising at least two of a fixed wavelength direction-bound add/drop transponder, a fixed wavelength directionless add/drop transponder, a tunable wavelength direction-bound add/drop transponder, and a tunable wavelength directionless add/drop transponder.

A fixed wavelength direction-bound, which may be referred to as a coloured and direction-bound (C-D) add/drop transponder is one for which the wavelength at which the add and the drop are operable is fixed, the direction from which a channel to be added may be received is fixed and the direction to which a channel to be dropped may be delivered is fixed.

A fixed wavelength directionless add/drop transponder, which may be referred to as a coloured and directionless (C-DL) add/drop transponder, is one for which the wavelength at which the add and the drop are operable is fixed, the direction from which a channel to be added may be received may be varied and the direction to which a channel to be dropped may be delivered may be varied.

A tunable wavelength direction-bound add/drop transponder, which may be referred to as a colourless and direction-bound (CL-D), is one for which the wavelength at which the add and the drop are operable may be varied, the direction from which a channel to be added may be received is fixed and the direction to which a channel to be dropped may be delivered is fixed.

A tunable wavelength directionless add/drop transponder, which may be referred to as colourless and directionless (CL-DL), is one for which the wavelength at which the add and the drop is operable may be varied, the direction from which a channel to be added may be received may be varied and the direction to which a channel to be dropped may be delivered may be varied.

There are at least two add/drop transponders in each node, the add/drop transponders comprising at least two of any of the four types (C-D, C-DL, CL-D and CL-DL) of add/drop transponder. Each node may therefore comprise at least two transponders of a single type or at least two transponders each of a different type.

Figure 1:
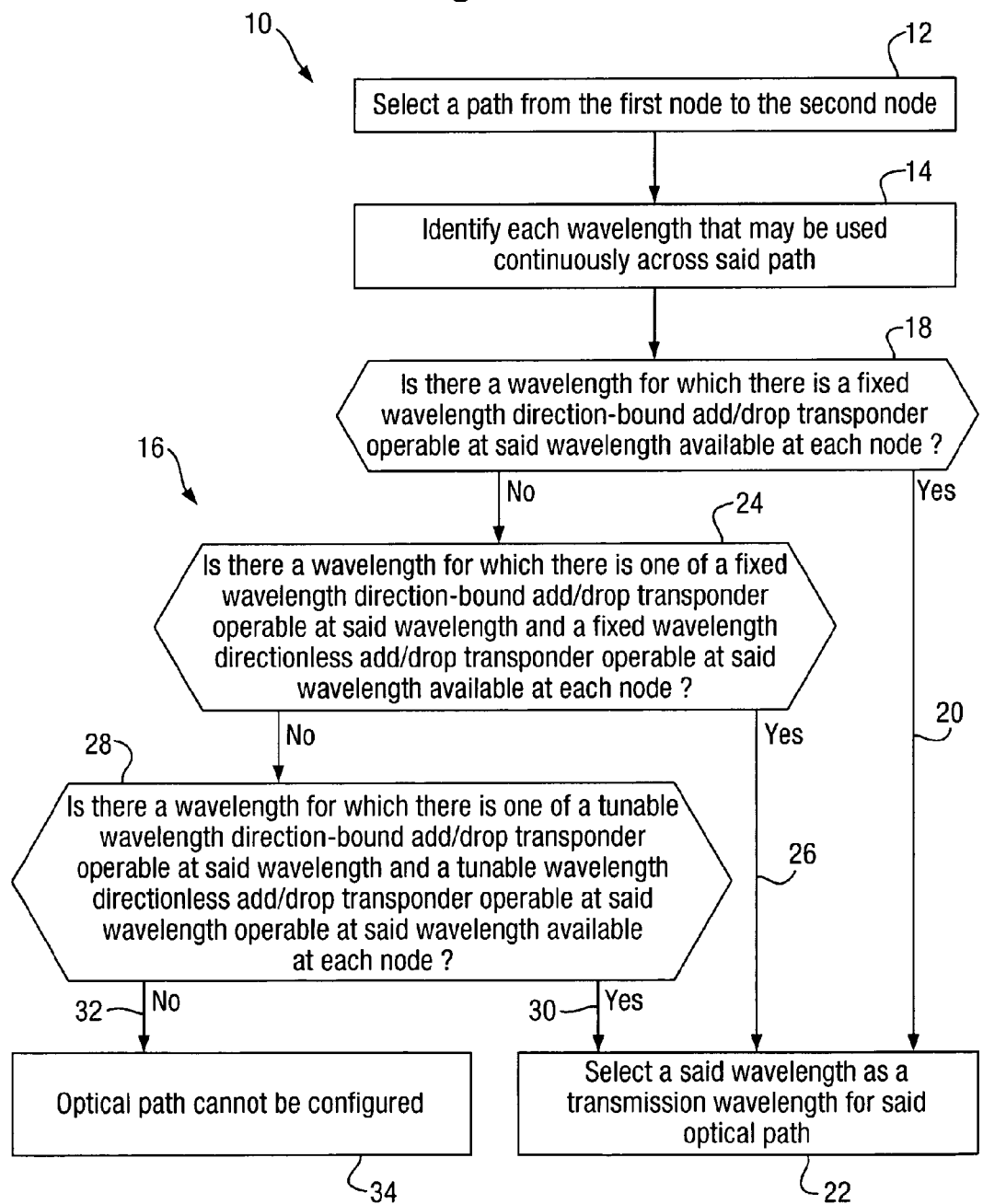
FIG. 1 shows the steps of a method of configuring an optical path from a first node to a second node in an optical communications network according to a first embodiment of the invention.

The steps of the method 10 are shown in FIG. 1. The method 10 comprises: selecting a path from the first node to the second node 12; identifying each wavelength that may be used continuously across said path 14; and selecting a transmission wavelength for said optical path 16.

The method 10 comprises selecting as the transmission wavelength for said optical path a said wavelength which meets a first wavelength requirement 18, 20, 22. The first wavelength requirement requires that at each said node a fixed wavelength direction-bound add/drop transponder operable at said wavelength is available 18.

If the first wavelength requirement is not met, the method 10 comprises selecting as the transmission wavelength a said wavelength which meets a second wavelength requirement 22, 24, 26. The second wavelength requirement requires that at each said node one of a fixed wavelength direction-bound add/drop transponder operable at said wavelength and a fixed wavelength directionless add/drop transponder operable at said wavelength is available 24.

If the second wavelength requirement is not met, the method 10 comprises selecting as the transmission wavelength a said wavelength for which at each said node one of a tunable wavelength direction-bound add/drop transponder operable at said wavelength and a tunable wavelength directionless add/drop transponder operable at said wavelength is available 22, 28, 30.

Where none of the said wavelength requirements configuration of the optical path is blocked 32, 34.

This embodiment therefore enables an optical path to be configured which takes into account the add-drop capacity (number and type) of the add/drop transponder at the first and second node.

A second embodiment of the invention provides a method of configuring an optical path from a first node to a second node in an optical communications network. The method of this embodiment is similar to the method 10 of the first embodiment, with the following modifications. The same reference numbers are retained for corresponding steps.

Figure 2:
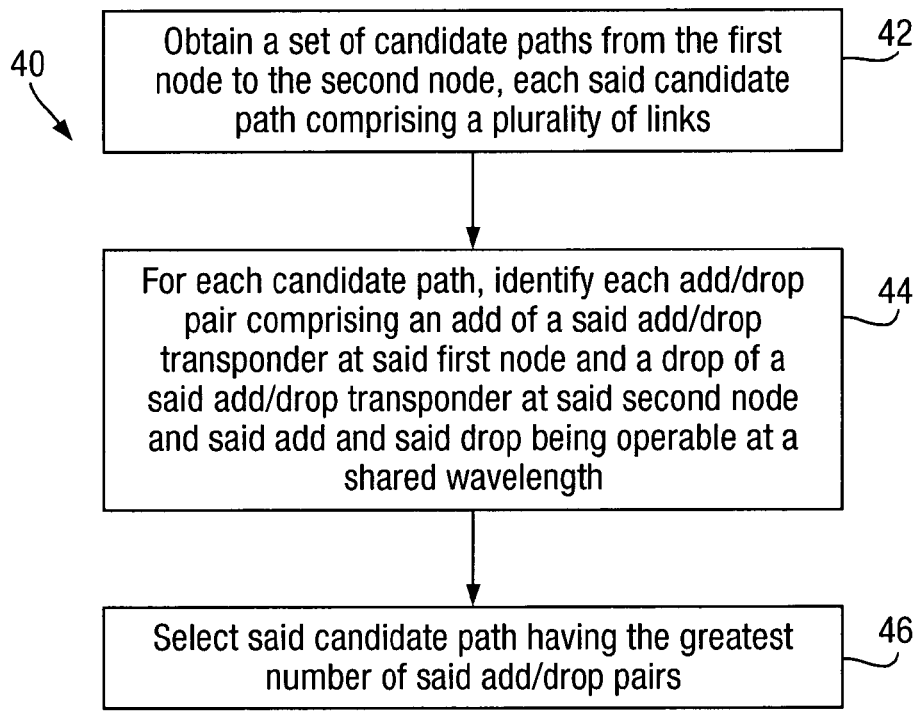
FIG. 2 shows the steps of selecting a path from a first node to a second node of a method of configuring an optical path from a first node to a second node in an optical communications network according to a second embodiment of the invention.

The steps 40 of selecting a path from the first node to the second node 12 of this embodiment are shown in FIG. 2. A path is selected by:
 a. obtaining a set of candidate paths from the first node to the second node, each candidate path comprising a plurality of links 42;
 b. for each candidate path, identifying each add-drop pair comprising an add of an add/drop transponder at the first node and a drop of an add/drop transponder at the second node and for which the add and the drop are operable at a shared wavelength 44; and
 c. selecting the candidate path having the greatest number of identified add-drop pairs 46.

Since each candidate path comprises a plurality of links it will be appreciated that each candidate path therefore comprises one or more intermediate nodes. Each link is a bi-directional link and the path to be configured between the first node and the second node will therefore be a bi-directional path, that is to say the path will be capable of carrying traffic from the first node to the second node and vice versa, between the add/drop transponders of each add-drop pair. It will be appreciated that while the method comprises identifying add-drop pairs comprising an add at the first node and a drop at the second node, a complementary add-drop pair comprising the respective add at the second node and the respective drop at the first node is defined as a result, for transmission from the second node to the first node.

It will be understood that while the add and the drop within an add-drop pair are operable at the same wavelength, each add-drop pair may be operable at a different wavelength.

Figure 3:
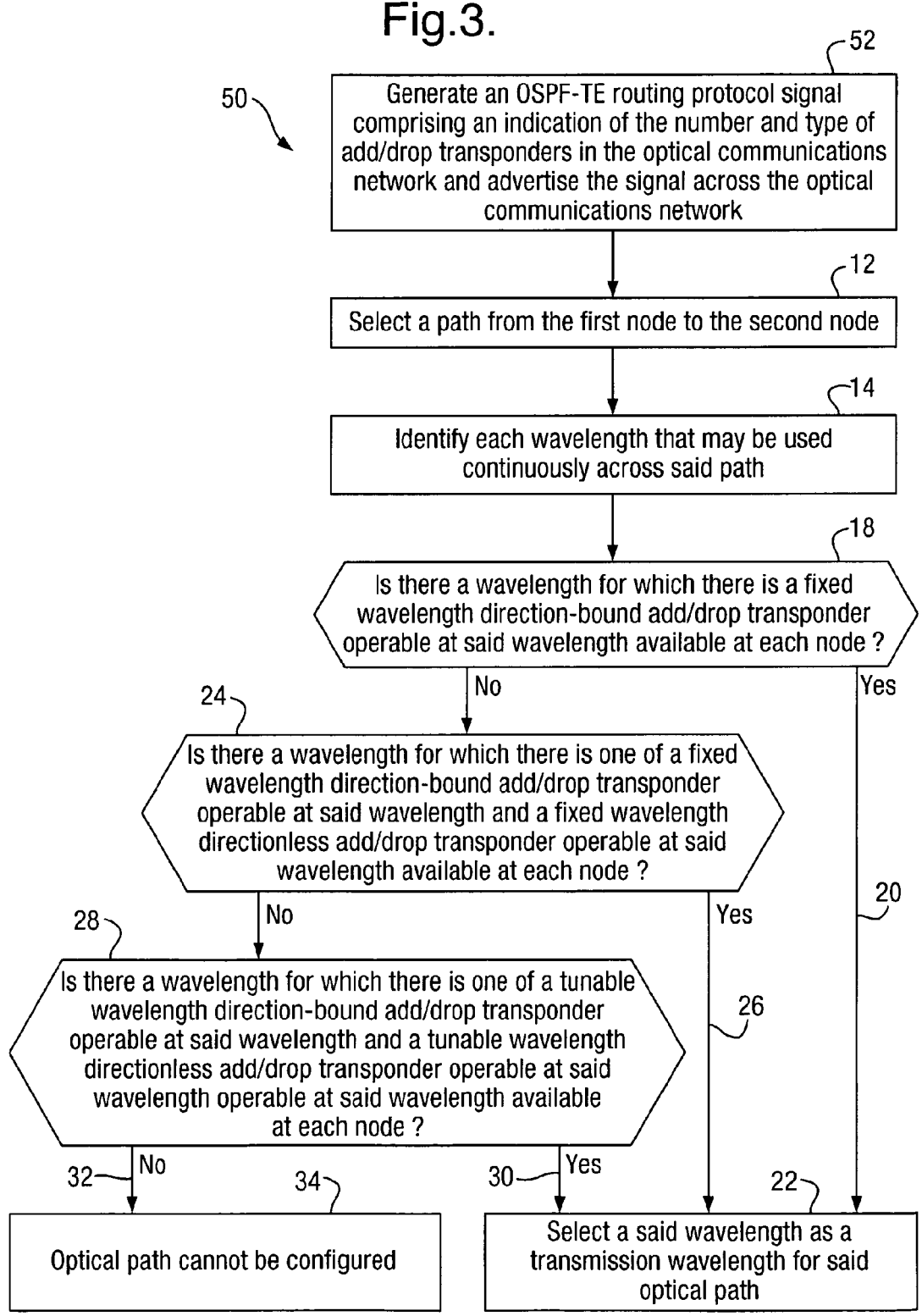
FIG. 3 shows the steps of a method of configuring an optical path from a first node to a second node in an optical communications network according to a third embodiment of the invention.

FIG. 3 shows the steps of a method 50 of configuring an optical path from a first node to a second node in an optical communications network according to a third embodiment of the invention. The method 50 of this embodiment is similar to the method 10 of FIG. 1, with the following modifications. The same reference numbers are retained for corresponding steps.

In this embodiment, the method 50 further comprises an initialising step comprising generating an open shortest path first traffic engineering, OSPF-TE, routing protocol signal 52. The OSPF-TE routing protocol is extended to advertise the number and type of add/drop transponders in the network. The generated OSPF-TE routing protocol signal comprises an indication of the number of add/drop transponders in the network and an indication of the type of each add/drop transponder, that is to say an indication identifying each add/drop transponder as being one of a C-D add/drop transponder, a C-DL add/drop transponder, a CL-D add/drop transponder and a CL-DL add/drop transponder.

The OSPF-TE routing protocol signal is advertised across the optical communications network, so that the information indicating the number and type of add/drop transponders in the network is flooded across the network.

It will be appreciated that where the method is used to configure a number of different paths across a communications network, the OSPF-TE routing protocol signal need not be generated and advertised before configuring each path but may simply be generated and advertised before applying the remaining steps of the method to configure each of the paths.

It will also be appreciated that in using the OSPF-TE routing protocol a generalised multiprotocol label switching protocols, GMPLS, control plane is assumed.

Figure 4:
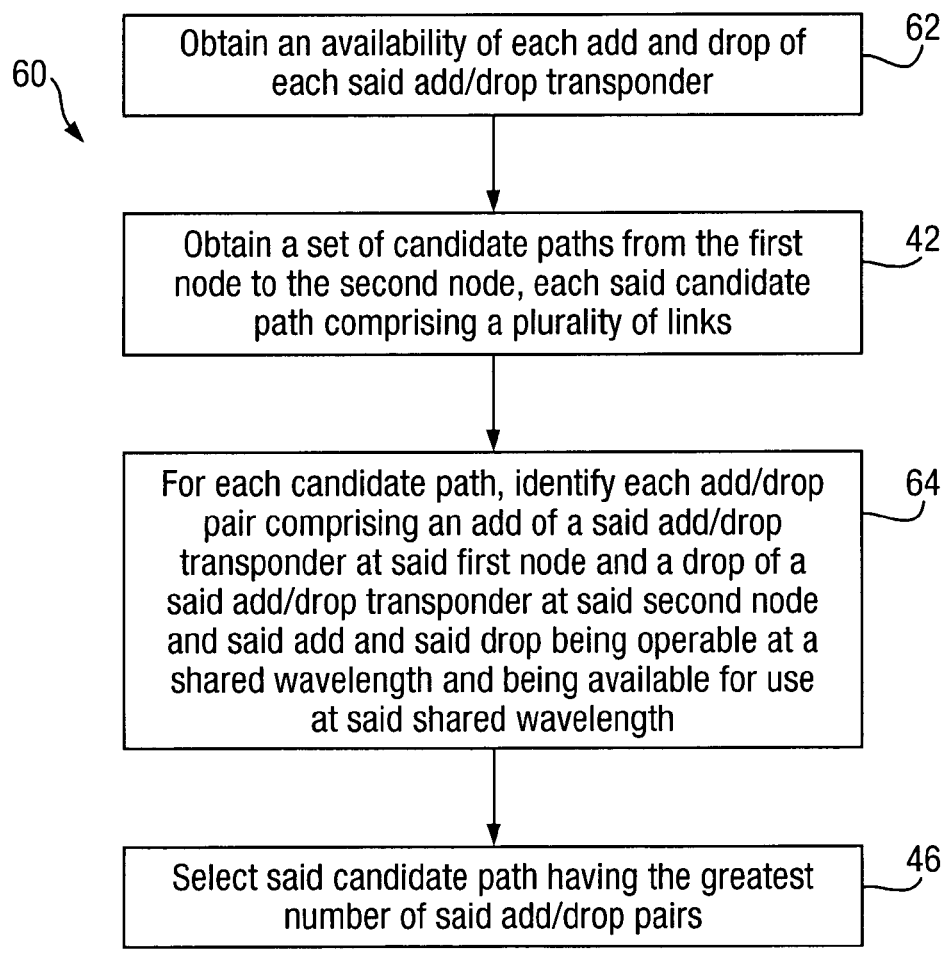
FIG. 4 shows the steps of selecting a path from a first node to a second node of a method of configuring an optical path from a first node to a second node in an optical communications network according to a fourth embodiment of the invention.

A fourth embodiment of the invention provides a method of configuring an optical path from a first node to a second node in an optical communications network. The steps 60 of selecting a path from the first node to the second node of this embodiment are shown in FIG. 4. The remaining steps of the method of this embodiment are the same as those shown in FIG. 1 or FIG. 3.

The steps 60 of selecting a path of this embodiment are similar to the steps 40 of selecting a path shown in FIG. 2, with the following modifications. The same reference numbers are retained for corresponding steps.

In this embodiment the selection of a path commences with obtaining an availability of each add and each drop of each add/drop transponder at each of the first and second nodes. In the step 64 of identifying add-drop pairs operable at a shared wavelength, the selection of a path in this embodiment further requires the add and the drop in a pair to be available for use at the shared wavelength. This embodiment therefore enables an optical path to be configured with takes into account both add/drop transponder capacity and availability.

Figure 5:
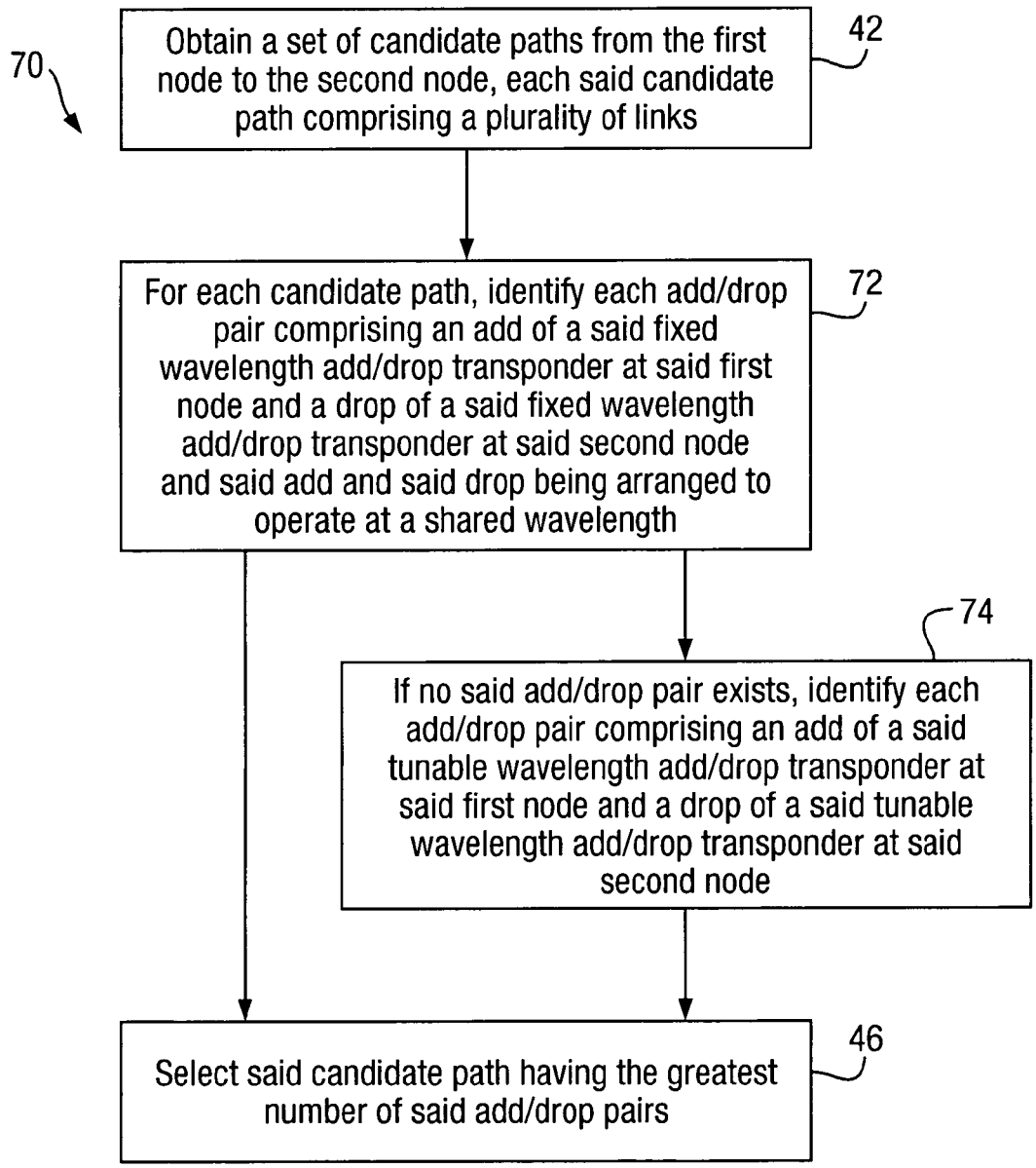
FIG. 5 shows the steps of selecting a path from a first node to a second node of a method of configuring an optical path from a first node to a second node in an optical communications network according to a fifth embodiment of the invention.

A fifth embodiment of the invention provides a method of configuring an optical path from a first node to a second node in an optical communications network. The steps 70 of selecting a path from the first node to the second node of this embodiment are initialised by obtaining an availability of each add and each drop of each add/drop transponder at the first node and the second node. The remaining steps 70 of selecting a path are shown in FIG. 5. The remaining steps of the method of this embodiment are the same as those shown in FIG. 1 or FIG. 3.

The steps 70 of selecting a path of this embodiment are similar to the steps 40 of selecting a path shown in FIG. 2, with the following modifications. The same reference numbers are retained for corresponding steps.

The steps 70 of selecting a path are initialised by obtaining an availability of each add and each drop of each add/drop transponder at the first node and the second node. The steps 70 of selecting a path further comprise:
  a. obtaining a set of candidate paths from the first node to the second node, each candidate path comprising a plurality of links 42;
  b. for each candidate path:
    i. identifying each add-drop pair comprising an add of a fixed wavelength (i.e. C-D or C-DL) add/drop transponder at the first node and a drop of a fixed wavelength add/drop transponder at the second node, the add and the drop being arranged to operate at a shared wavelength 72; and
    ii. if no said add-drop pair exists, identifying each add-drop pair comprising an add of a tunable wavelength (i.e. CL-D or CL-DL) add/drop transponder at the first node and a drop of a tunable wavelength add/drop transponder at the second node 74; and
  c. selecting the candidate path having the greatest number of identified add-drop pairs 46.

The method of this embodiment thereby selects add-drop pairs comprising fixed wavelength add/drop transpondersin preference to add-drop pairs comprising tunable wavelength pairs. This may ensure that tunable wavelength add/drop transponders remain available for use at wavelengths other than those at which the fixed wavelength add/drop transponders operate at.

Figure 6:
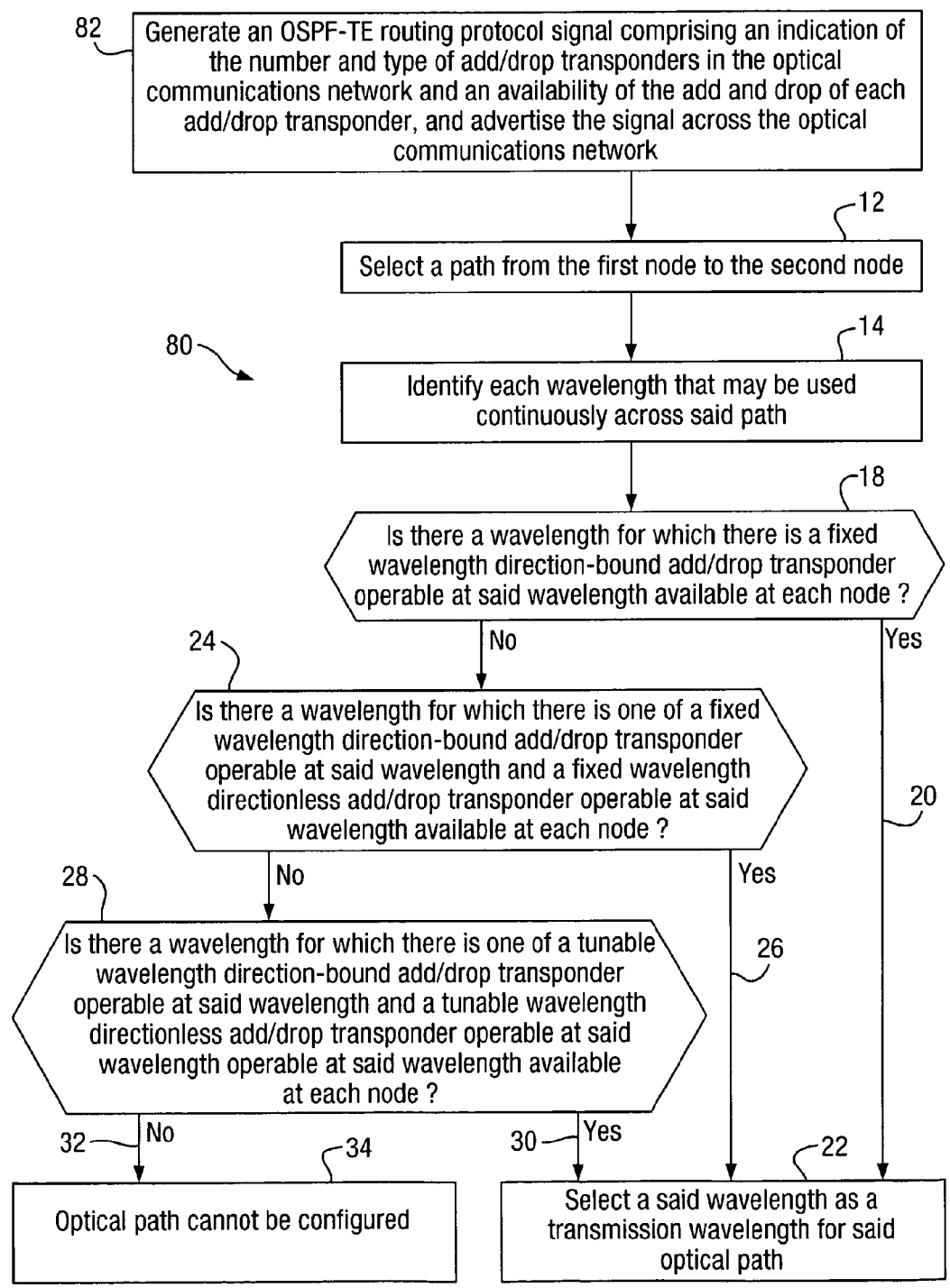
FIG. 6 shows the steps of a method of configuring an optical path from a first node to a second node in an optical communications network according to a sixth embodiment of the invention.

FIG. 6 shows the steps of a method 80 of configuring an optical path from a first node to a second node in an optical communications network according to a sixth embodiment of the invention. The method 80 of this embodiment is similar to the method 10 of FIG. 1, with the following modifications. The same reference numbers are retained for corresponding steps.

In this embodiment, the method 80 further comprises an initialising step comprising generating an open shortest path first traffic engineering, OSPF-TE, routing protocol signal 82. The OSPF-TE routing protocol is extended to advertise the number, type and availability of add/drop transponders in the network. The generated OSPF-TE routing protocol signal comprises an indication of the number of add/drop transpondersin the network and an indication of the type of each add/drop transponder, that is to say an indication identifying each add/drop transponder as being one of a C-D add/drop transponder, a C-DL add/drop transponder, a CL-D add/drop transponder and a CL-DL add/drop transponder. The generated OSPF-TE routing protocol signal further comprises an indication of the availability of the add and the drop of each add/drop transponder, that is whether each add and each drop is available for use or whether it is already in use and is therefore unavailable for use by the path being configured.

The OSPF-TE routing protocol signal is advertised across the optical communications network, so that the information indicating the number, type and availability of add/drop transpondersin the network is flooded across the network.

It will be appreciated that where the method is used to configure a number of different paths across a communications network, the OSPF-TE routing protocol signal need not be generated and advertised before configuring each path but may simply be generated and advertised before applying the remaining steps of the method to configure each of the paths.

It will also be appreciated that in using the OSPF-TE routing protocol a generalised multiprotocol label switching protocols, GMPLS, control plane is assumed.

Figure 7:
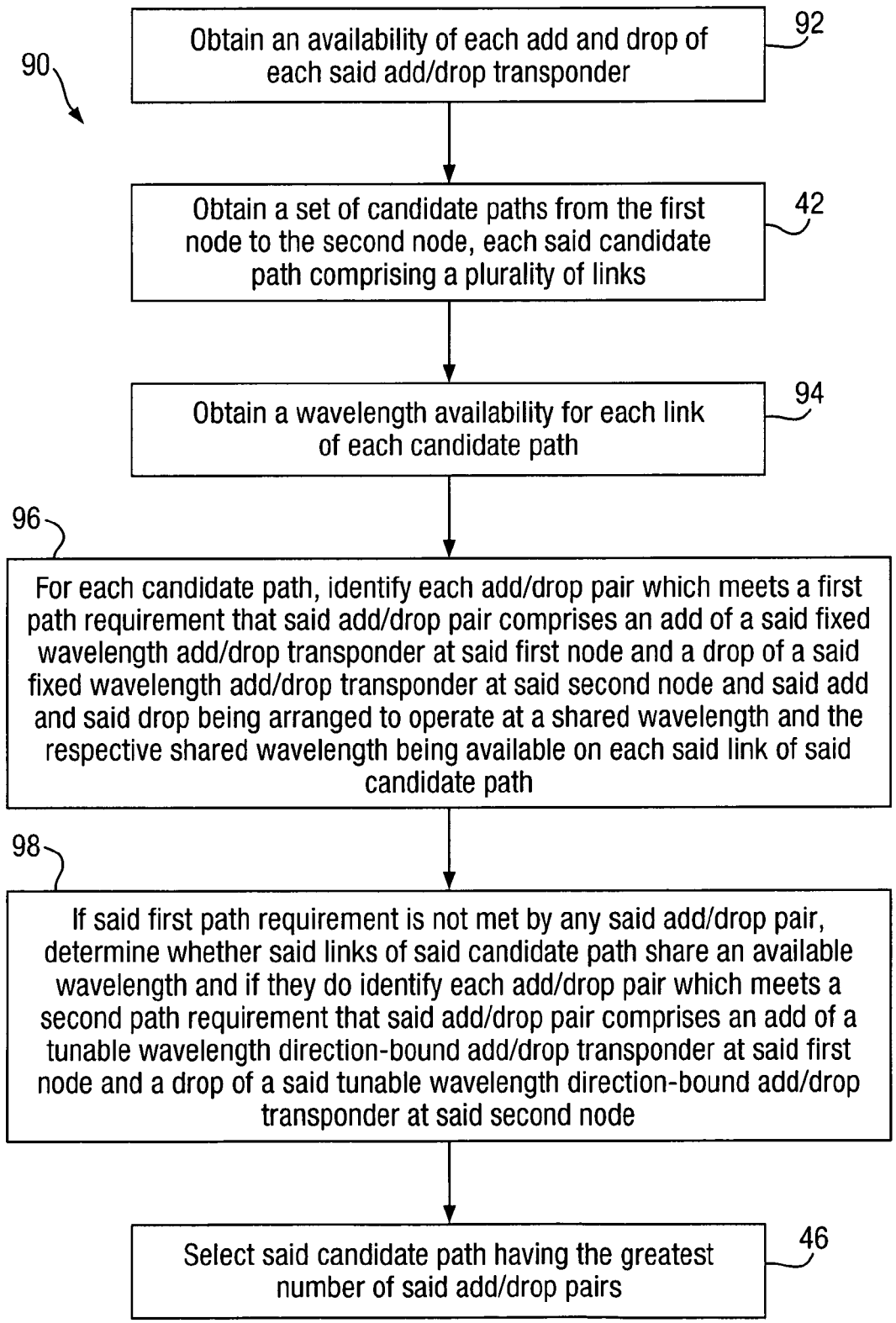
FIG. 7 shows the steps of selecting a path from a first node to a second node of a method of configuring an optical path from a first node to a second node in an optical communications network according to a seventh embodiment of the invention.

A seventh embodiment of the invention provides a method of configuring an optical path from a first node to a second node in an optical communications network. The steps 90 of selecting a path from the first node to the second node of this embodiment are shown in FIG. 7. The steps 70 of selecting a path of this embodiment are similar to the steps 40 of selecting a path shown in FIG. 2, with the following modifications. The same reference numbers and letters are retained for corresponding steps.

The remaining steps of the method of this embodiment are the same as those shown in FIG. 1, FIG. 3 or FIG. 6.

The steps 90 of selecting a path comprise:
  obtaining an availability of each add and each drop of each add/drop transponder at the first node and the second node 92;
  a. obtaining a set of candidate paths from the first node to the second node, each candidate path comprising a plurality of links 42;
  obtaining a wavelength availability for each link of each candidate path 94;
  b. for each candidate path:
    i. identifying each add-drop pair which meets a first path requirement that the add-drop pair comprises an add of a fixed wavelength (i.e. C-D or C-DL) add/drop transponder at the first node and a drop of a fixed wavelength add/drop transponder at the second node, the add and the drop being arranged to operate at a shared wavelength and the respective shared wavelength being available on each link of the candidate path 96;

ii. if the first path requirement is not met by any add-drop pair, determining whether the links of the candidate path share an available wavelength and if they do, identifying each add-drop pair which meets a second path requirement that the add-drop pair comprises an add of a tunable wavelength direction-bound (CL-D) add/drop transponder at the first node and a drop of a CL-D add/drop transponder at the second node 98; and c. selecting the candidate path having the greatest number of identified add-drop pairs 46.

This embodiment therefore enables an optical path to be configured which takes into account the add-drop availability (number, type and availability) of the add/drop transponder at the first and second node and the wavelength availability of the links.

Figure 8:
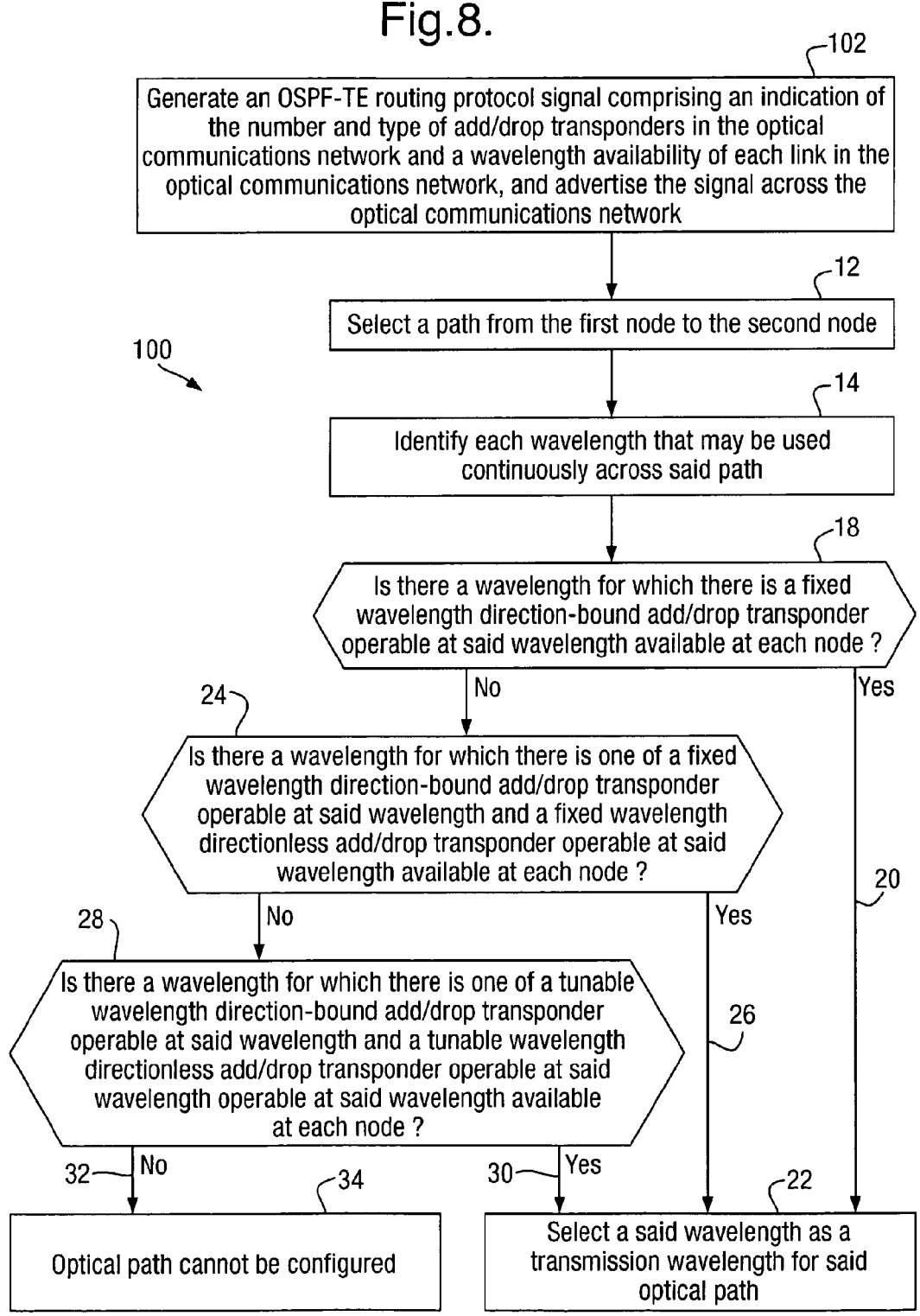
FIG. 8 shows the steps of a method of configuring an optical path from a first node to a second node in an optical communications network according to an eighth embodiment of the invention, the step of selecting an optical path being as shown in FIG. 7.

FIG. 8 shows the steps of a method 100 of configuring an optical path from a first node to a second node in an optical communications network according to an eighth embodiment of the invention. The method 100 of this embodiment is similar to the method 80 of FIG. 6, with the following modifications. The same reference numbers are retained for corresponding steps.

In this embodiment, the initialising step comprises generating an open shortest path first traffic engineering, OSPF-TE, routing protocol signal 102. The OSPF-TE routing protocol is extended to advertise the number and type of add/drop transponders in the network and the wavelength availability of each link. The generated OSPF-TE routing protocol signal comprises an indication of the number of add/drop transpondersin the network and an indication of the type of each add/drop transponder, that is to say an indication identifying each add/drop transponder as being one of a C-D add/drop transponder, a C-DL add/drop transponder, a CL-D add/drop transponder and a CL-DL add/drop transponder. The generated OSPF-TE routing protocol signal further comprises an indication of the wavelength availability of each link in the network, that is which wavelength or wavelengths are available for use on each link and are not already in use by another path.

This embodiment therefore enables an optical path to be configured which takes into account the add-drop capacity (number and type) of the add/drop transponder at the first and second node and the wavelength availability of the links.

Figure 9:
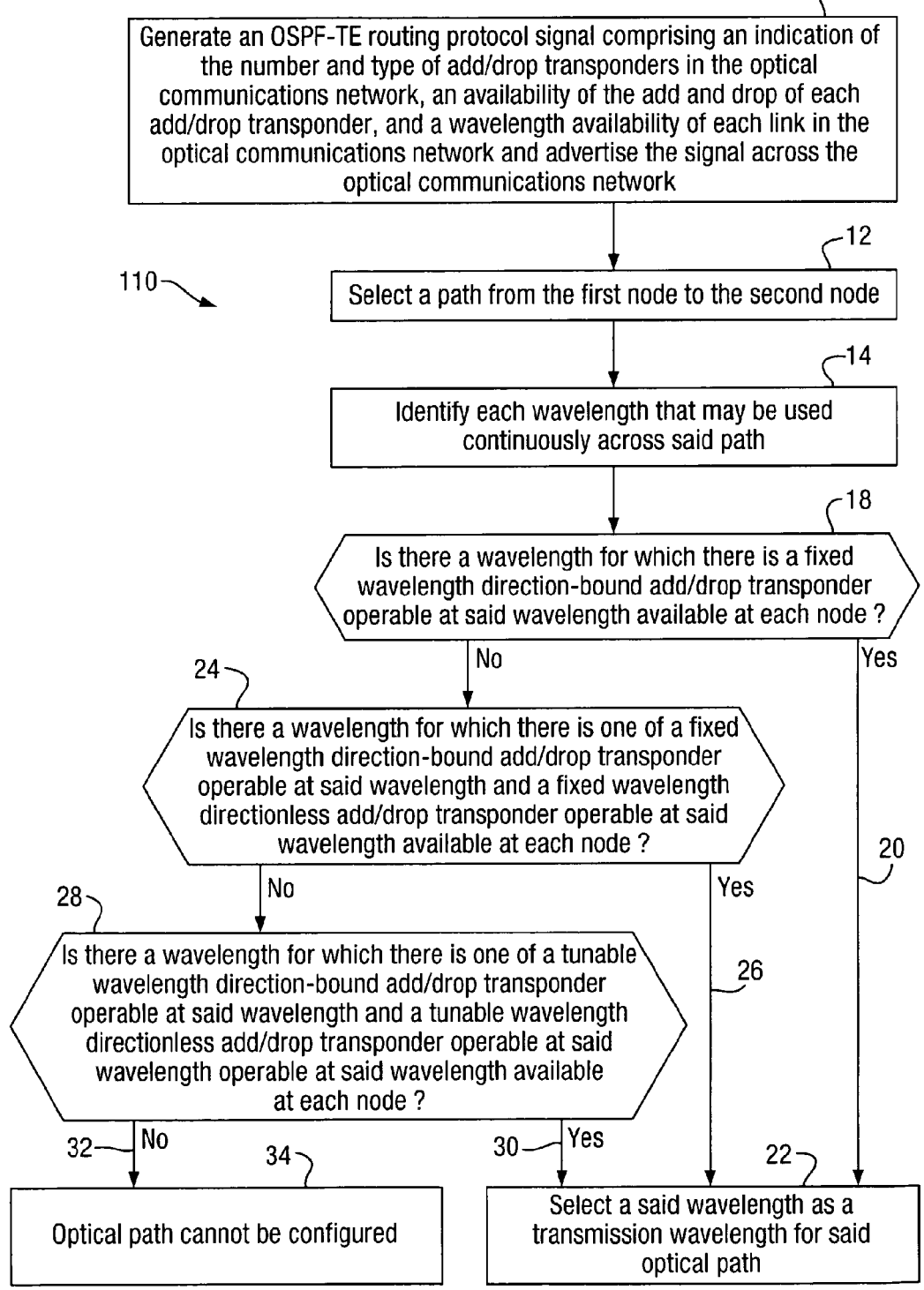
FIG. 9 shows the steps of a method of configuring an optical path from a first node to a second node in an optical communications network according to a ninth embodiment of the invention, the step of selecting an optical path being as shown in FIG. 7.

FIG. 9 shows the steps of a method 110 of configuring an optical path from a first node to a second node in an optical communications network according to a ninth embodiment of the invention. The method 110 of this embodiment is similar to the method 80 of FIG. 6, with the following modifications. The same reference numbers are retained for corresponding steps.

In this embodiment, the initialising step comprises generating an open shortest path first traffic engineering, OSPF-TE, routing protocol signal 112 which additionally comprises an indication of the wavelength availability of each link in the network, that is which wavelength or wavelengths are available for use on each link and are not already in use by another path.

The OSPF-TE routing protocol is extended to advertise the number and type of add/drop transponders in the network and the wavelength availability of each link.

Figure 10:
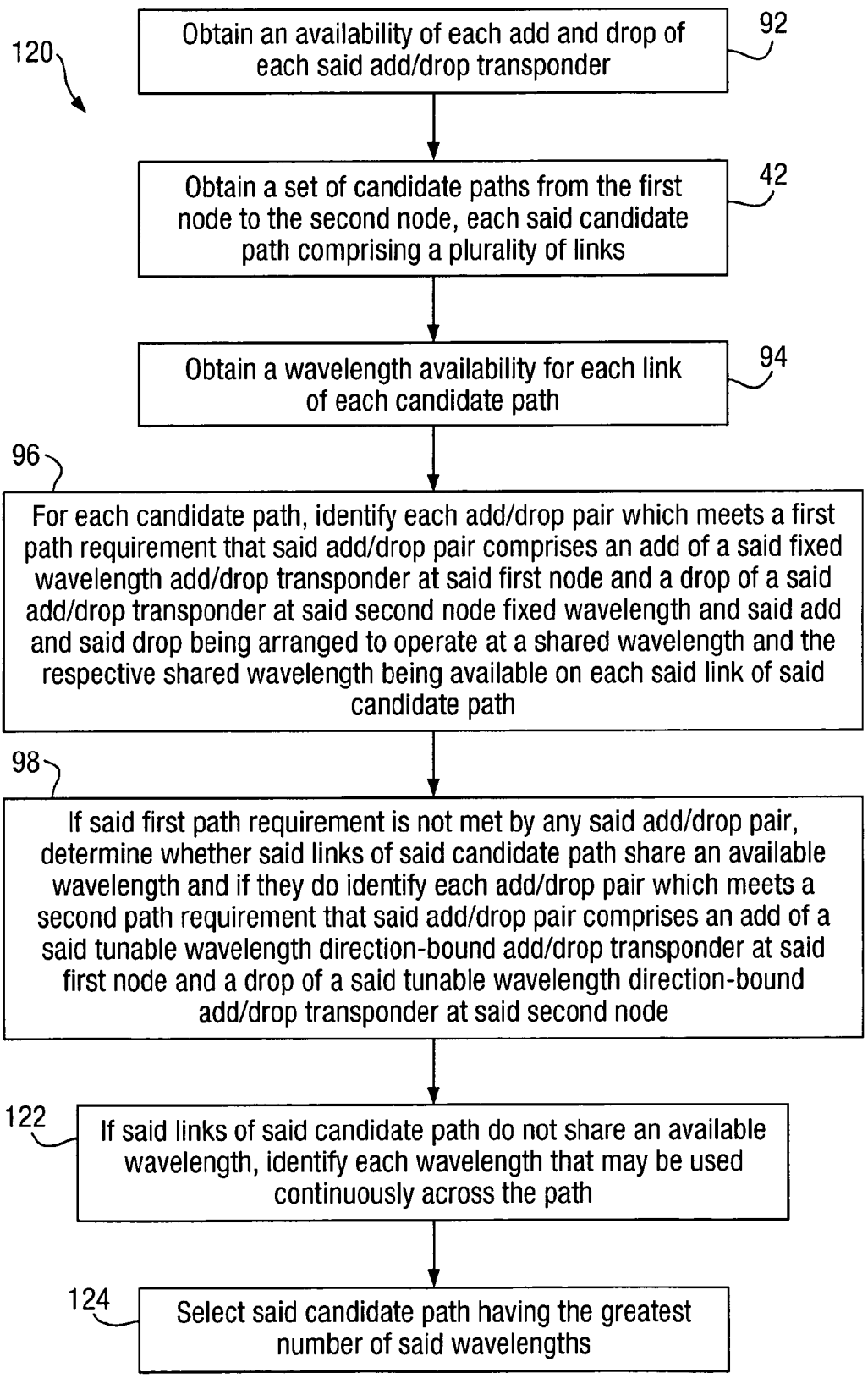
FIG. 10 shows the steps of selecting a path from a first node to a second node of a method of configuring an optical path from a first node to a second node in an optical communications network according to a tenth embodiment of the invention.

A tenth embodiment of the invention provides a method of configuring an optical path from a first node to a second node in an optical communications network. The steps 120 of selecting a path from the first node to the second node of this embodiment are shown in FIG. 10. The steps 120 of selecting a path of this embodiment are similar to the steps 90 of selecting a path shown in FIG. 7, with the following modifications. The same reference numbers and letters are retained for corresponding steps.

The remaining steps of the method of this embodiment are the same as those shown in any of FIGS. 1, 3, 6, 8 and 9.

In this embodiment, the step b. further comprises:

iii. if said second path requirement is not met by any said add-drop pair, identifying each wavelength that may be used continuously across the path 122.

Step c. comprises selecting the candidate path having the greatest number of said wavelengths 124.

Figure 11:
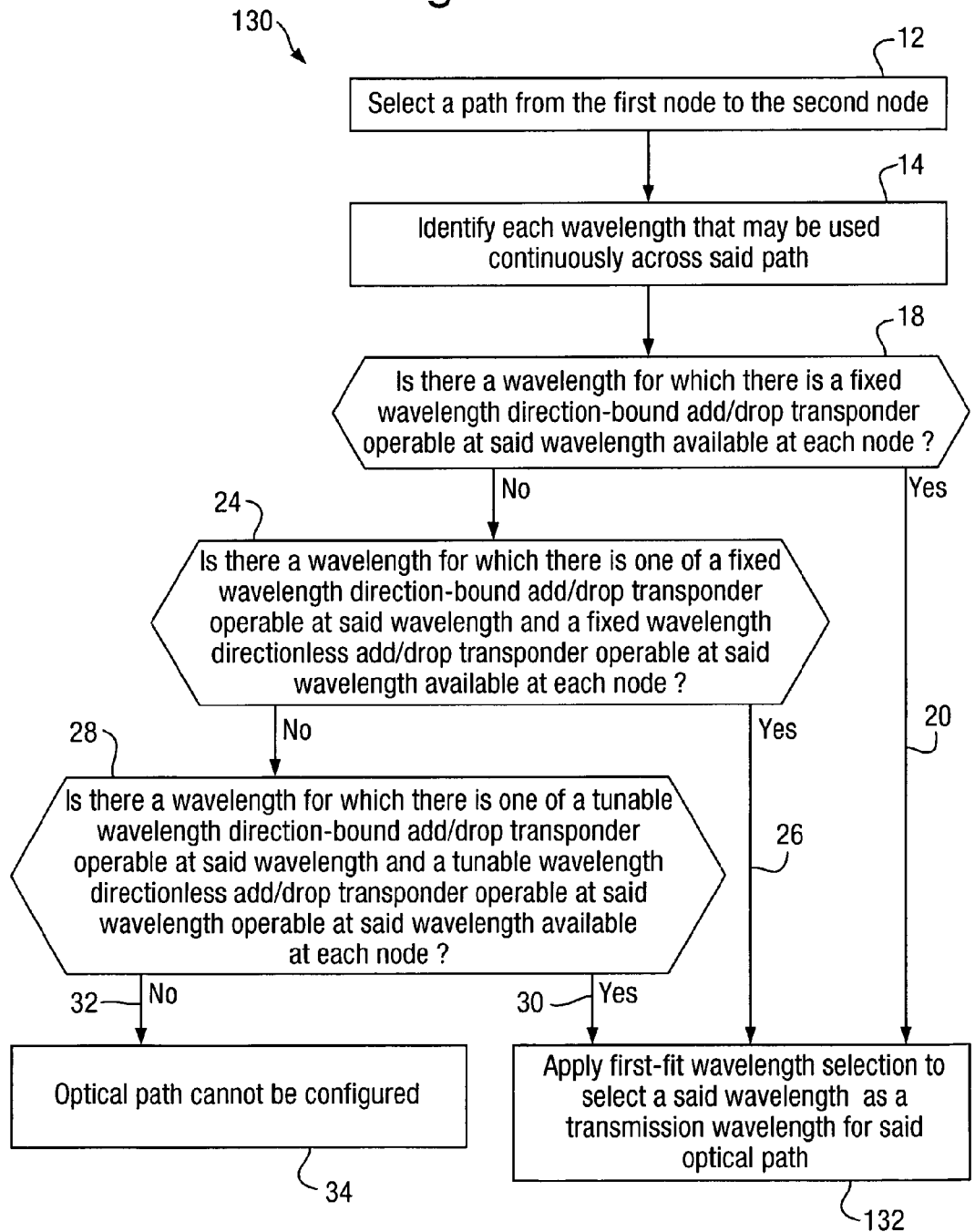
FIG. 11 shows the steps of selecting a path from a first node to a second node of a method of configuring an optical path from a first node to a second node in an optical communications network according to an eleventh embodiment of the invention.

FIG. 11 shows the steps of a method 130 of configuring an optical path from a first node to a second node in an optical communications network according to an eleventh embodiment of the invention. The method 130 of this embodiment is similar to the method 10 of FIG. 1, with the following modifications. The same reference numbers are retained for corresponding steps.

In this embodiment, first-fit wavelength selection is applied to select a wavelength as a transmission wavelength for the optical path 132.

In first-fit wavelength selection each wavelength within a communications network is allocated a wavelength index and if a plurality of wavelengths are available to be selected from, each of which satisfies the continuity constraint, the wavelength with the lowest index is selected first. First-fit wavelength selection will be well known to persons skilled in the art so will not be described in further detail here.

Figure 12:
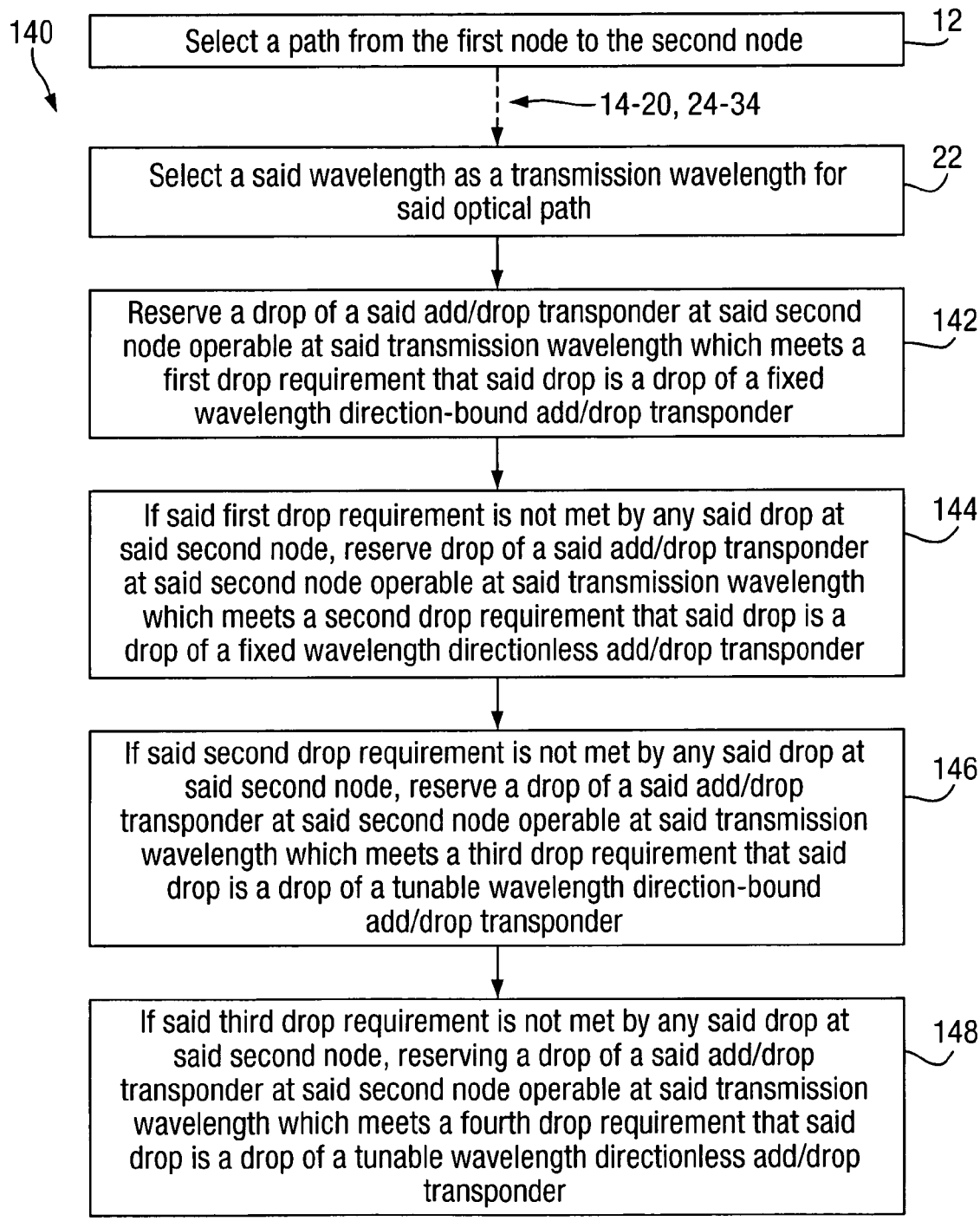
FIG. 12 shows part of the steps of selecting a path from a first node to a second node of a method of configuring an optical path from a first node to a second node in an optical communications network according to a twelfth embodiment of the invention.

FIG. 12 shows part of the steps of a method 140 of configuring an optical path from a first node to a second node in an optical communications network according to a twelfth embodiment of the invention. The method 140 of this embodiment is similar to the method 10 of FIG. 1, with the following modifications. The same reference numbers are retained for corresponding steps.

For clarity in FIG. 12 only steps 12 and 22 are shown but it will be appreciated that the method 140 of this embodiment additionally includes steps 14-20 and 24-34, as shown in full in FIG. 1.

In this embodiment, the method 140 further comprises:

i. reserving a drop of an add/drop transponder at said second node operable at the transmission wavelength which meets a first drop requirement that said drop is a drop of a C-D add/drop transponder 142;

ii. and if the first drop requirement is not met by any drop at the second node, reserving a drop of an add/drop transponder at the second node operable at the transmission wavelength which meets a second drop requirement that the drop is a drop of a C-DL add/drop transponder 144;

iii. and if the second drop requirement is not met by any drop at the second node, reserving a drop of an add/drop transponder at the second node operable at the transmission wavelength which meets a third drop requirement that the drop is a drop of a CL-D add/drop transponder 146;

iv. and if the third drop requirement is not met by any drop at the second node, reserving a drop of an add/drop transponder at the second node operable at the transmission wavelength which meets a fourth drop requirement that the drop is a drop of a CL-DL add/drop transponder 148.

The method 140 therefore reserves drops at the second node in accordance with a preference ranking in which the least flexible drops (C-D) are allocated first and the most flexible drops (CL-DL) are allocated last. The utilisation of resources may therefore be maximised by only reserving the most flexible drops when no other drop is available.

Figure 13:
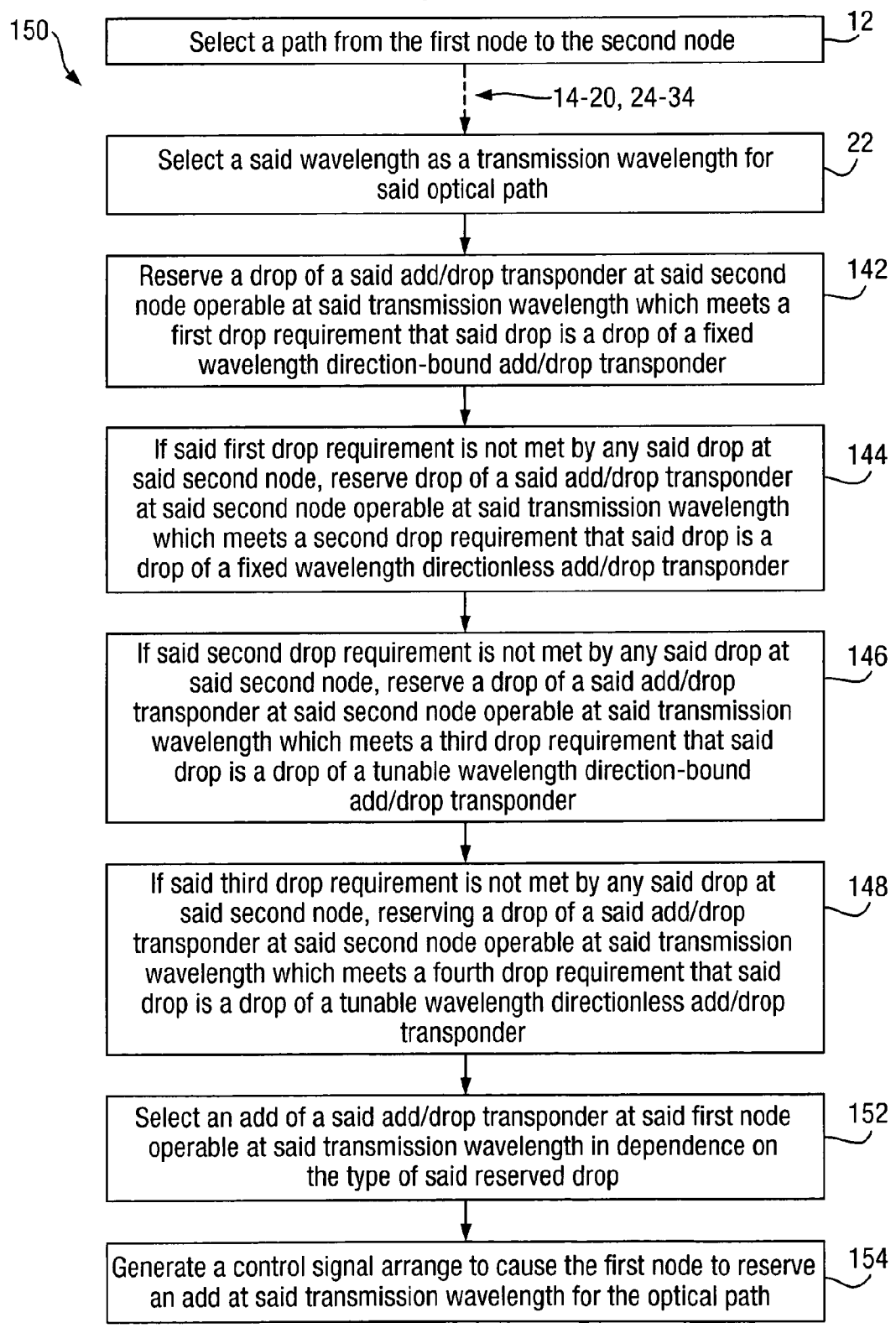
FIG. 13 shows part of the steps of selecting a path from a first node to a second node of a method of configuring an optical path from a first node to a second node in an optical communications network according to a thirteenth embodiment of the invention.

FIG. 13 shows part of the steps of a method 150 of configuring an optical path from a first node to a second node in an optical communications network according to a thirteenth embodiment of the invention. The method 150 of this embodiment is similar to the method 140 of FIG. 12, with the following modifications. The same reference numbers are retained for corresponding steps.

In this embodiment the method 150 further comprises selecting an add of an add/drop transponder at the first node operable at the transmission wavelength 152. The add is selected according to the same preference ranking (C-D, then C-DL, then CL-D, then CL-DL) described above.

The method 150 may further comprise generating a control signal arranged to cause the first node to select an add at the selected transmission wavelength for the optical path and to reserve the selected add. The method 150 may alternatively further comprise generating a control signal arranged to cause the first node to reserve the selected add.

A method of configuring an optical path from a first (source) node, s, to a second (destination) node, d, in an optical communications network according to a fourteenth embodiment of the invention will now be described with reference to FIG. 14.

In this example, the first node, s, comprises five C-D add/drop transponders 160-168 and one C-DL add/drop transponder 170. The first add/drop transponder 60 is operable at a first wavelength, W1, and its output direction is fixed onto a first link 172 connecting the first node, s, with a first intermediate node, x. The second add/drop transponder 162 is operable at a second wavelength, W2, and the third add/drop transponder 164 is operable at a third wavelength, W3. The second and third add/drop transponders 162, 164 each have a fixed output direction onto a second link 174 between the first node, s, and a second intermediate node, z. The fifth add/drop transponder 166 is operable at a fifth wavelength, W5 and the sixth add/drop transponder 168 is operable at a sixth wavelength, W6. The fifth and sixth add/drop transponders 166, 168 have directionally fixed outputs connected to a third link 176, connecting the first node, S, to a third intermediate node, i. The fourth add/drop transponder 170 is operable at a fourth wavelength, W4, and the direction of this output may be varied so that the output may be to either of the three links 172, 174, 176 connected to the first node, s.

The second node, d, has six C-D add/drop transponders 178-188. The first add/drop transponder 178 is operable at the first wavelength, W1, and has a fixed direction output coupled to a fourth link 190 extending from the second node, d, to a fourth intermediate node, y. The second add/drop transponder 180 at the second node, d, is operable at the second wavelength, W2, the third add/drop transponder 182 at the second node is operable at the third wavelength, W3, and the fourth add/drop transponder 184 at the second node is operable at the fourth wavelength, W4. Each of the second, third and fourth add/drop transponders 180, 182, 184 have fixed direction outputs coupled to a fifth link 192 from the second node, d, to the second intermediate node, z. The fifth add/drop transponder 186 of the second node is operable at the fifth wavelength, W5, and the sixth add/drop transponder 188 at the second node is operable at the sixth wavelength, W6. The fifth and sixth add/drop transponders 186, 188 have fixed direction outputs coupled to a sixth link 196 between the second node, d and a fifth intermediate node, k. Each add/drop transponder comprises an add and a drop. The add/drop transponders at each node in this embodiment are provided by a reconfigurable optical add/drop multiplexer (ROADM) at each of the first node, s, and the second node, d.

In this embodiment, the add/drop transponder capacity, ie the number of add/drop transponders and the type of each add/drop transponder (C-D, C-DL, CL-D or CL-DL) is advertised across the network using an OSPF-TE routing protocol signal which has been extended to advertise the add/drop capacity. The first node, s, and the second node, d, are provided with updated availability information of their local add and drops.

The method of this embodiment comprises selecting a path from the first node, s, to the second node, d. If the first node, s, has no available adds the path cannot be configured. Otherwise, a set of candidate paths across the network from the first to the second node is generated. For each candidate path the number, N, of possible available fixed wavelength (C-) add/drop pairs operable at the same wavelength is calculated. In this embodiment, the drops at the second node are assumed to be available.

The number, N, of add/drop pairs comprises four contributions, N1+N2+N3+N4. N1 comprises the number of add/drop pairs comprising C-D adds operable at the same wavelength, N2 comprises the number of add/drop pairs comprising C-D adds and C-DL drops operable at the same wavelength, N3 comprises add/drop pairs comprising C-DL adds and C-D drops operable at the same wavelength, and N4 comprises the number of add/drop pairs comprising C-DL adds and drops operable at the same wavelength.

Figure 14:
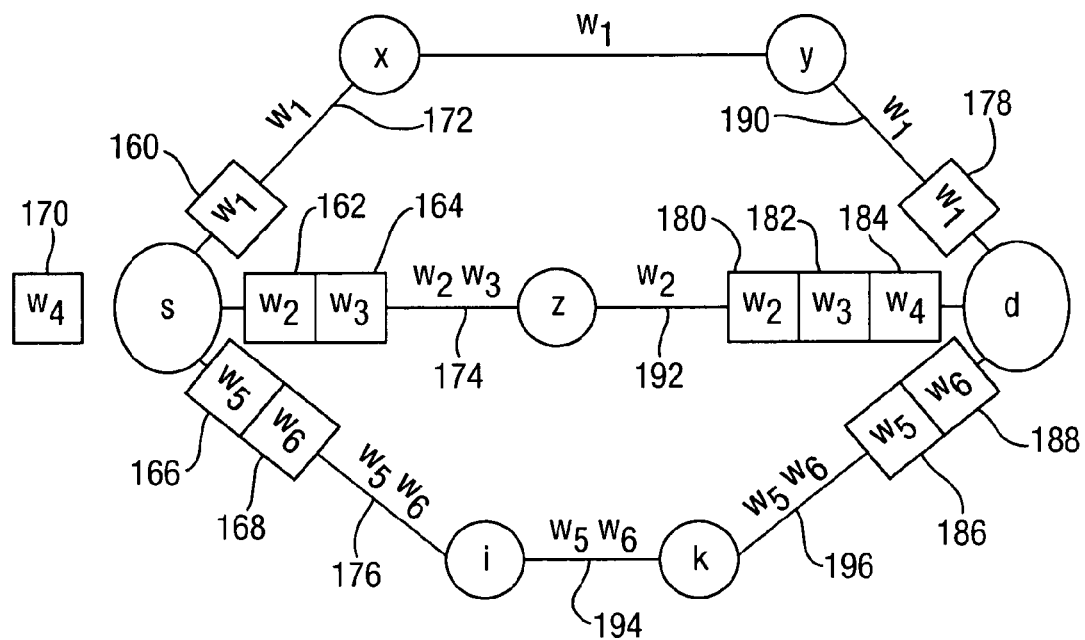
FIG. 14 is a diagrammatic representation of three candidate paths from a first node (source, S,) to a second node (destination, d)

Referring to FIG. 14, the first candidate path, s-x-y-d, from the first node to the second node extends via the first intermediate node, x, and the fourth intermediate node, y. The path s-x-y-d comprises one add/drop pair comprising a C-D add 160 and a C-D drop 178, therefore N1=1. There are no other types of add/drops therefore each of N2, N3 and N4 are zero and N=1.

The second candidate path from the first node to the second node, s-z-d, has two add/drop pairs comprising C-D adds and drops, namely the adds and drops at the second and third wavelength, W2 and W3. The path s-z-d also comprises one add/drop pair comprising a C-DL add at the fourth wavelength, W4, and a C-D drop at the fourth wavelength W4. Therefore the path s-z-d has N1=2 and N3=1. There are no other types of add/drops therefore N=3.

The third candidate path from the first node to the second node, s-i-k-d, has two add/drop pairs comprising C-D adds and drops therefore N1=2. There are no other types of add/drops on this candidate path therefore each of N2, N3 and N4 equal zero and N=2.

The candidate path having the largest number of add/drop pairs is selected for use as the optical path from the first node, s, to the second node, d. Therefore in this embodiment the second candidate path, s-z-d, is selected since it has N=3.

In the scenario where each of the candidate paths has no fixed wavelength (C-) add/drop pairs operable at the same wavelength, ie N=0, N is calculated for each candidate path as the number of tunable wavelength add/drops (CL-D or CL-DL) available on the candidate path.

Following selection of a path from the first node to the second node, the method then comprises identifying each wavelength which may be used continuously across the selected path, as follows. If at least one CL add is available on the first link of the path, a label set is generated comprising the set of available wavelengths on that first link. In this example the first link is the link from the first node, s, to the second intermediate node, z, and there are no CL adds available on this link. The label set is therefore initialized comprising the wavelengths available on the first link, in this example W2 and W3, for which a C-D or a C-DL add is available at the first node. In this example, there is a C-D add available for each of W2 and W3 therefore the label set is initialized with wavelengths W2 and W3.

An RSVP-TE signalling protocol signal is then transmitted across the selected path, s-z-d, propagating and updating the label set with the actual wavelength availability on each link along the path. When the label set arrives at the second node, d, each wavelength which satisfies a continuity constraint that it is available for use on each link of the path maybe identified. In this example, there is one wavelength, W2, which satisfies the continuity constraint along the path since this wavelength is available on both links, 174, 192.

First fit wavelength selection is then performed for wavelengths enabling C-D add/drop, which in this example selects W2 as the wavelength for the path.

In the case where there are no wavelengths which satisfy the continuity constraint for which a C-D add/drop is available, first fit is applied to wavelengths which satisfy the continuity constraint for which C-D and C-DL add/drops are available. If no such wavelength is available, first fit is applied to wavelengths which satisfy the continuity constraint for which CL-D and CL-DL add/drops are available.

Once a wavelength has been selected for the selected path, a drop at the second node, d, is reserved. In this example, the drop of the add/drop transponder operable at W2 is reserved.

In the situation where more than one add/drop transponder is available at the second node for the selected wavelength, a drop is reserved in accordance with the preference rank, as described above, in which C-D add/drop transponders are most preferred to be selected, then C-DL, CL-D and CL-DL are the least preferred.

Once a drop has been reserved at the second node, an RSVP-TE reservation signal is generated and transmitted across the path to the first node, s. An add at the first node operable at the selective selected wavelength is then selected applying the preference rank. In this example the C-D add operable at W2 is selected.

The method of this embodiment may also be used where add/drop transponder capacity and availability are advertised across the network.

Referring again to FIG. 14, a fifteenth embodiment of the invention provides a method of configuring an optical path from a first node, s, to a second node, d, in an optical communications network. The method of this embodiment is similar to the method of the previous embodiment, with the following modifications.

In this embodiment, the add/drop transponder capacity and the wavelength availability of each link is advertised across the network.

In this embodiment, once the set of candidate paths has been identified the process of selecting a path from the first node to the second node comprises identifying the number, N, of possible add/drop pairs operable at the same wavelength for which the continuity constraint is met across the path.

In this embodiment, the path s-x-y-d has one C-D add/drop pair operable at wavelength W1 and each of the links of the path are available at W1. Wavelength W1 therefore satisfies the continuity constraint across the path and the path s-x-y-d has a value N=1.

As discussed in relation to the previous embodiment, the path s-z-d has three add/drop pairs operable at shared wavelengths, however only wavelength W2 is available on both of the links 174, 192 of the path and therefore the path s-z-d also has a value N=1. The path s-i-k-d has two C-D add/drop transponder pairs operable at wavelengths W5 and W6 and each of the links 176, 194, 196 of the path are available at both wavelengths W5 and W6, therefore both of these wavelengths satisfy the continuity constraint and the path s-i-k-d has a value N=2.

The candidate path, in this example, s-i-k-d, having the largest value of N is selected as the path from the first node to the second node.

Where each candidate path has a value N=0, the method then comprises calculating the number of CL-D add/drops of each candidate path which has at least one wavelength which satisfies the continuity constraint. If N again=0 for each candidate path, the method then comprises computing the number of wavelengths along each candidate path which satisfy the continuity constraint. The candidate path having the maximum value of N is then selected.

The method of this embodiment may also be used where add/drop transponder availability is also advertised across the network.

Figure 15:
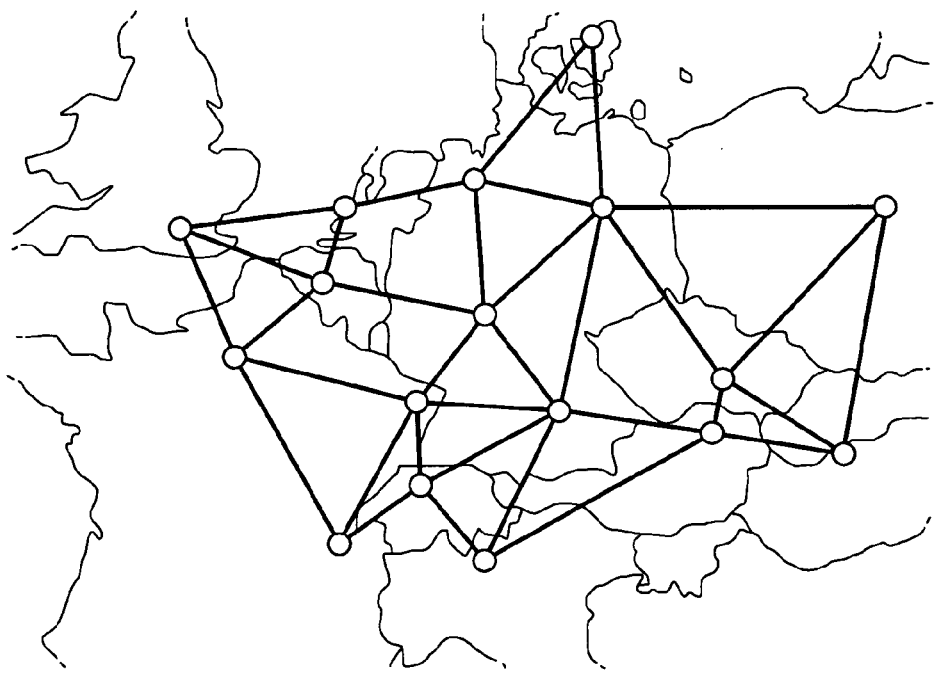
FIG. 15 shows the Pan-European network topology.

A simulation of path computation on the Pan-European network topology, shown in FIG. 15, has been carried out using a C++ event-driven simulator. The network topology used comprised 17 nodes, 33 links and 40 wavelengths.

It was assumed that the number of adds and drops available at each node was 30% of the total number of wavelength channels in the outgoing links from each node. The simulation assumed that at each node 10 adds and drops are C-DL, while the remaining adds and drops are C-D. Lightpath requests are assumed to be uniformly distributed among pairs of the nodes. Inter-arrival and holding times of the lightpath requests are assumed to be exponentially distributed with an average of $1/\lambda$ and $1/\mu$=500 s, respectively. The set of candidate paths from a first node to a second node included all paths within one hop from the shortest path.

Figure 16:
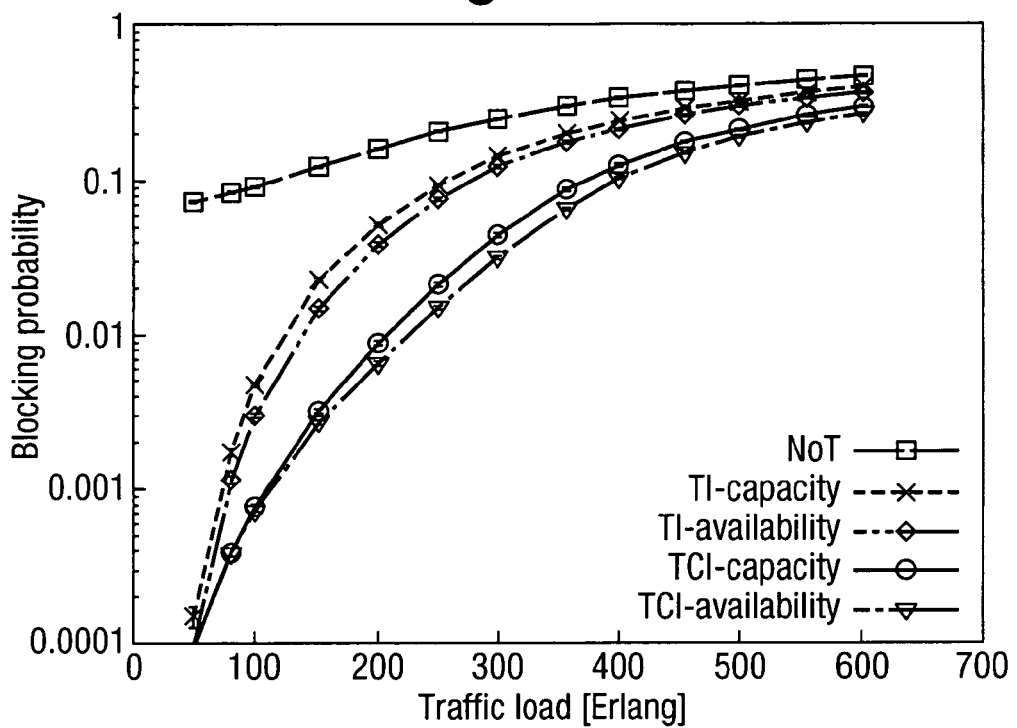
FIG. 16 shows blocking probability as a function of network load obtained applying a known method of path computation in which no information about the add/drop transponders is distributed across the network (square data points) and the method of configuring an optical path of the present invention add/drop transponder capacity (cross data points), add/drop transponder availability (diamond data points), add/drop transponder capacity and wavelength availability of links (circle data points), and add/drop transponder availability and wavelength availability of links (triangle data points)

A path computation simulation was carried out for each of the following five different network scenarios:
1. no add/drop transponder information (NoT) is distributed across the network and the path is selected randomly from the set of candidate paths;
2. add/drop transponder capacity is distributed across the network (for example, as in the third embodiment of the invention);
3. add/drop transponder availability is distributed across the network (for example, as in the sixth embodiment of the invention);
4. add/drop transponder capacity and wavelength availability of links is distributed across the network (for example, as in the eighth embodiment of the invention);
5. add/drop transponder availability and wavelength availability of links is distributed across the network (for example, as in the ninth embodiment of the invention);

The blocking probability as a function of network load for each of the simulated scenarios is shown in FIG. 16: NoTu (square data points); add/drop transponder capacity (cross data points); add/drop transponder availability (diamond data points); add/drop transponder capacity and wavelength availability of links (circle data points) add/drop transponder availability and wavelength availability of links (triangle data points).

In the NoT scenario, a path from the first node to the second node is randomly selected from the set of candidate paths and only the operating wavelength of drops is provided. As can be seen from FIG. 16, the embodiments of the method of configuring an optical path according to present invention (i.e. scenarios 2-5) experience lower blocking than the first scenario in which no add/drop transponder information is distributed across the network. Indeed, with the NoT scenario, flexible adds and drops (e.g., C-DL) are quickly exhausted since the routing does not account of add/drop information.

On the contrary, the method of configuring an optical path according to the present invention preferentially uses C-D add/drop transponders and only selects the other types of add/drop transponders for use (e.g., CL-DL) if strictly necessary.

It can also be seen in FIG. 16 that a high blocking reduction is obtained with scenarios 4 and 5, in which wavelength availability is additionally provided, with respect to scenarios 2 and 3, in which only add/drop transponder capacity or availability is provided. There are two reasons for this. Firstly, the main blocking experienced by scenarios 2 and 3 is due to the lack of wavelengths satisfying the continuity constraint across the path. This blocking contribution is particularly dominant when tunable wavelength adds are not available at the first node, so that the label set is initialized only with wavelengths that are available on the first link for which an add is available at the first node. In comparison, in scenarios 4 and 5 path configuration also takes the wavelength availability of each link into account, thus increasing the probability of finding a path with wavelengths satisfying the continuity constraint. Secondly, wavelength availability on a link is strictly related to the add/drop capacity and availability. For instance, if the second node has a C-D drop operable at wavelength Wi on a link j, and Wi on link j is used by a lightpath traversing the second node, the first node will be aware that this drop cannot be used, so this information is taken into consideration during path configuration.

By comparing the results for scenario 1 with those for scenario 2 and comparing the results for scenario 3 with those for scenario 4, it can be seen that providing add/drop transponder availability provides an advantage over just providing add/drop transponder capacity. When add/drop transponder availability it provided the label set is initialized comprising only the wavelengths of available adds on a path. For this reason a wavelength which for which no add is available at the first node cannot be selected. Moreover, given the advertised add/drop transponder capacity information, a wavelength may be selected at which a less flexible add/drop transponder is operable, thus saving CL-DL and C-DL adds for later use.

In terms of control plane load, the following OSPF-TE LSA Updates (Up) must be advertised. In case of NoT, no Updates are generated (Up=0). For scenario 2, add/drop transponder capacity information is refreshed but no updates are triggered upon lightpath establishment (Up=0). Thus, NoT and scenario 2 give rise to similar control plane loads in terms of RSVP-TE packets. For scenario 3, both add and drop availability updates Up=2 are required. For scenario 4, Up=hp, where hp is the number of hops in the path that has been configured, advertise changes in wavelength availability on the links of the path. For scenario 5, Up=2+hp, to update add and drop availability and wavelength availability on the links of the path that has been configured. The resulting control plane loads, in terms of RSVP-TE packets, at a traffic load of 300 Erlang are 5 packets/s for NoT and scenario 2, 120 packets/s for scenario 3, 174 packets/s for scenario 4 and 298.8 packets/s for scenario 5.

Figure 17:
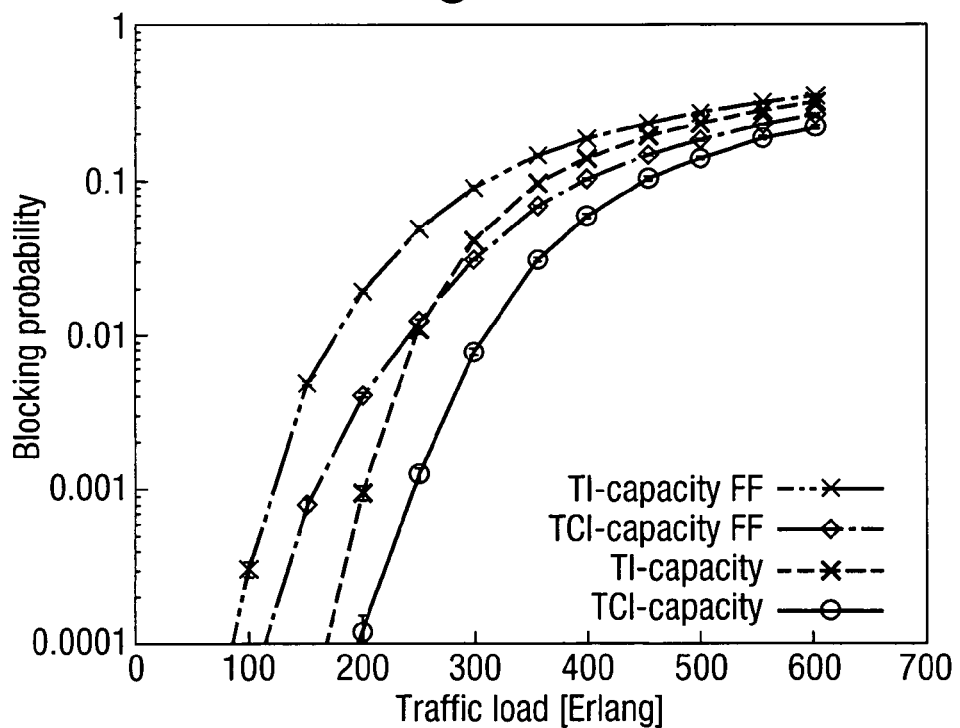
FIG. 17 shows blocking probability as a function of network load obtained applying the method of configuring an optical path of the present invention utilising number and type of add/drop transponders (bold cross data points) and number and type of add/drop transponders and wavelength availability of links (circle data points), compared with a known method of configuring an optical path based on first-fit wavelength selection for number and type of add/drop transponders and (light cross data points) and number and type of add/drop transponders, and wavelength availability of links (diamond data points)

FIG. 17 shows a comparison blocking probability as a function of network load for each of scenarios 2 (bold cross data points) and 4 (circle data points) with a known method of configuring an optical path which uses first fit wavelength selection. where add/drop transponder capacity (light cross data points) and add/drop transponder capacity and wavelength availability on the links (diamond data points) is provided. As shown in FIG. 17, scenarios 2 and 4 enables flexible add/drop resources to be saved for later use thus enabling a strong reduction in path blocking.

Figure 18:
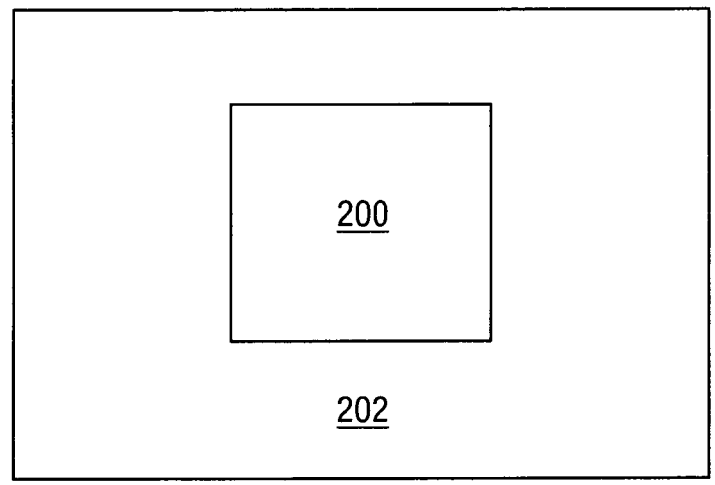
FIG. 18 is a schematic representation of a path computation engine according to a fourteenth embodiment of the invention.
Figure 19:
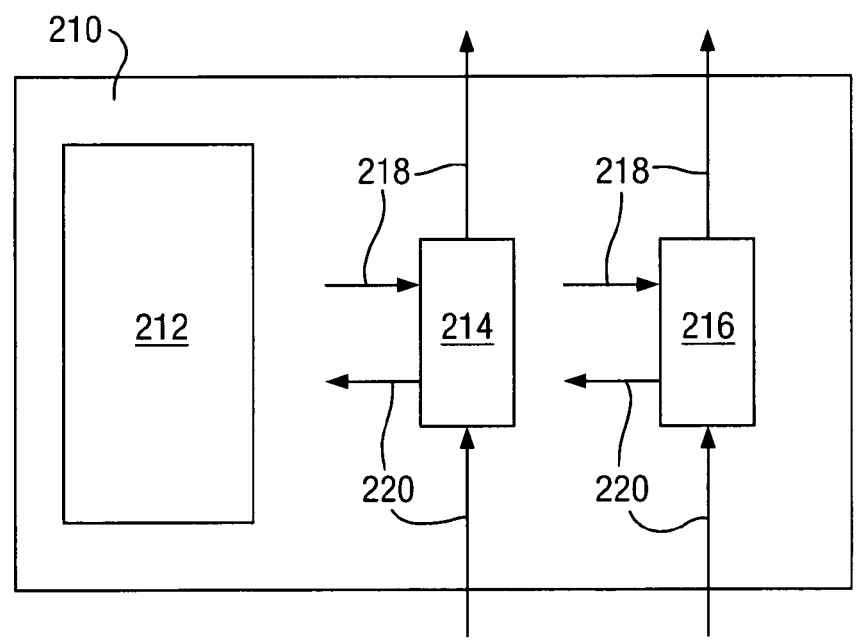
FIG. 19 is a schematic representation of an optical communications network node according to a fifteenth embodiment of the invention.

Referring to FIG. 18, a fourteenth embodiment of the invention provides a path computation engine, PCE, 200. In this example the PCE 200 is provided within a network management system, NMS, 202.

The PCE 200 is arranged to configure an optical path from a first node to a second node in an optical communications network. Each node comprises a plurality of add/drop transponders comprising at least two of a fixed wavelength direction-bound add/drop transponder, a fixed wavelength directionless add/drop transponder, a tunable wavelength direction-bound add/drop transponder, and a tunable wavelength directionless add/drop transponder. The add/drop transponders each comprise an add and a drop.

The PCE 200 is arranged to select a path from the first node to the second node, identify each wavelength that may be used continuously across said path, and select a transmission wavelength for the optical path. The PCE 200 is arranged to select as the transmission wavelength one of the identified wavelengths which meets a first wavelength requirement that a fixed wavelength direction-bound add/drop transponder operable at said wavelength is available at each of the first node and the second node. The PCE 200 is further arranged, if the first wavelength requirement is not met, to select one of the identified wavelengths which meets a second wavelength requirement. The second wavelength requirement requires that one of a fixed wavelength direction-bound add/drop transponder and a fixed wavelength directionless add/drop transponder operable at said wavelength is available at each of the first node and the second node. The PCE 200 is further arranged, if the second wavelength requirement is not met, to select one of the identified wavelengths for which one of a tunable wavelength direction-bound add/drop transponder and a tunable wavelength directionless add/drop transponder operable at said wavelength is available at each of the first node and the second node.

A fifteenth embodiment of the invention provides an optical communications network node 210 comprising a controller 212 and a plurality of add/drop transponders 214, 216.

In this example only two add/drop transponders 214, 216 are shown for clarity but it will be appreciated that a larger number of add/drop transponders may be provided. The add/drop transponders 214, 216 comprise at least two of a C-D add/drop transponder, a C-DL add/drop transponder, a CL-D add/drop transponder, and a CL-DL add/drop transponder. In this example, the node 210 comprises a C-D add/drop transponder 214 and a CL-D add/drop transponder 216. It will be appreciated that the add/drop transponders 214, 216 may alternatively comprise a different one of the four possible types of add/drop transponder and that both add/drop transponders may be of the same type. Each add/drop transponder 214, 216 comprises an add 218a and a drop 220.

The controller 212 is arranged to select a path across an optical communications network from the node to a second node comprising a plurality of add/drop transponders. Each add/drop transponder of the second node similarly comprises at least two of a fixed wavelength direction-bound add/drop transponder, a fixed wavelength directionless add/drop transponder, a tunable wavelength direction-bound add/drop transponder, and a tunable wavelength directionless add/drop transponder, the add/drop transponders each comprising an add and a drop.

The controller 212 is further arranged to identify each wavelength that may be used continuously across the selected path and to select a transmission wavelength for the optical path. The controller 212 is arranged to select as the transmission wavelength one of the identified wavelengths which meets a first wavelength requirement that a fixed wavelength direction-bound add/drop transponder operable at that wavelength is available at each of the first node and the second node. The controller 212 is further arranged to, if the first wavelength requirement is not met, select one of the identified wavelengths which meets a second wavelength requirement. The second wavelength requirement requires that one of a fixed wavelength direction-bound add/drop transponder and a fixed wavelength directionless add/drop transponder operable at that wavelength is available at each of the first node and the second node. The controller 212 is further arranged to, if the second wavelength requirement is not met, select one of the identified wavelengths for which one of a tunable wavelength direction-bound add/drop transponder and a tunable wavelength directionless add/drop transponder operable at said wavelength is available at each of the first node and the second node.

The invention claimed is:

1. A method of configuring an optical path from a first node to a second node in an optical communications network, each node comprising a plurality of add/drop transponders comprising at least two of a fixed wavelength direction-bound add/drop transponder, a fixed wavelength directionless add/drop transponder, a tunable wavelength direction-bound add/drop transponder, and a tunable wavelength directionless add/drop transponder, the plurality of add/drop transponders each comprising an add and a drop, the method comprising:
   selecting a path from the first node to the second node;
   identifying each wavelength that may be used continuously across said path; and
   selecting a transmission wavelength for said optical path, wherein the selecting includes:
      determining that none of the identified wavelengths meet a first wavelength requirement, wherein the first wavelength requirement is met for a wavelength when a fixed wavelength direction-bound add/drop transponder operable at said wavelength is available at each of the first node and the second node;
      responsive to said determining that none of the identified wavelengths meet the first wavelength requirement, determining whether any of the identified wavelengths meet a second wavelength requirement, wherein the second wavelength requirement is met for a wavelength when one of a fixed wavelength direction-bound add/drop transponder and a fixed wavelength directionless add/drop transponder operable at said wavelength is available at each of the first node and the second node; and
      selecting one of the identified wavelengths as the transmission wavelength based upon a result of the determining whether any of the identified wavelengths meet the second wavelength requirement.

2. The method as claimed in claim 1, wherein said path is selected by:
   obtaining a set of candidate paths from the first node to the second node, each candidate path comprising a plurality of links;
   for each candidate path, identifying each add-drop pair comprising an add of said plurality of add/drop transponders at said first node and a drop of said plurality of add/drop transponders at said second node and said add and said drop being operable at a shared wavelength; and
   selecting said candidate path having the greatest number of said add-drop pairs.

3. The method as claimed in claim 1, wherein the method further comprises:
   generating an open shortest path first traffic engineering (OSPF-TE), routing protocol signal comprising an indication of the number of the plurality of add/drop transponders in the optical communications network and an indication identifying each of said plurality of add/drop transponders as one of said fixed wavelength direction-bound add/drop transponder, said fixed wavelength directionless add/drop transponder, said tunable wavelength direction-bound add/drop transponder, and said tunable wavelength directionless add/drop transponder; and
   advertising said OSPF-TE routing protocol signal across the optical communications network.

4. The method as claimed in claim 2, wherein the method further comprises:
   obtaining an availability of each add and drop of each said plurality of add/drop transponders; and
   wherein identifying, for each candidate path, each add-drop pair comprises identifying those add-drop pairs for which said shared wavelength is available for use at said shared wavelength.

5. The method as claimed in claim 2, wherein identifying, for each candidate path, each add-drop pair comprises:
   identifying those add-drop pairs that are arranged to operate at said shared wavelength, and if no said add-drop pair exists, identifying each add-drop pair comprising said add of a tunable wavelength add/drop transponder at said first node and said drop of a tunable wavelength add/drop transponder at said second node.

6. The method as claimed in claim 3, wherein the OSPF-TE routing protocol signal further comprises an indication of an availability of the add and an availability of the drop of each add/drop transponder.

7. The method as claimed in claim 2, wherein the method further comprises obtaining a wavelength availability for each of said plurality of links; and wherein identifying each add-drop pair step comprises, for each candidate path:
   identifying each add-drop pair which meets a first path requirement that requires said add-drop pair comprises said add of a fixed wavelength add/drop transponder at said first node and said drop of a fixed wavelength add/drop transponder at said second node and said add and said drop being arranged to operate at the shared wavelength and the shared wavelength being available on each of said plurality of links of said candidate path; and
   when said first path requirement is not met by any said add-drop pair, determining whether said plurality of links of said candidate path share an available wavelength and if they do, identifying each add-drop pair which meets a second path requirement that requires said add-drop pair comprises said add of a tunable wavelength direction-bound add/drop transponder at said first node and said drop of a tunable wavelength direction-bound add/drop transponder at said second node.

8. The method as claimed in claim 3, wherein the OSPF-TE routing protocol signal further comprises an indication of a wavelength availability of each of a plurality of links.

9. The method as claimed in claim 7, wherein when said second path requirement is not met by any said add-drop pair, then:
   the identifying each add-drop pair comprises, for each said candidate path, identifying each wavelength that may be used continuously across the path; and
   the selecting said candidate path comprises selecting the candidate path having the greatest number of said wavelengths.

10. The method as claimed in claim 1, wherein the transmission wavelength for the optical path is selected using a first-fit wavelength selection.

11. The method as claimed in claim 1, wherein the method further comprises generating a control signal arranged to cause the first node to reserve an add at said transmission wavelength for the optical path.

12. The method of claim 1, wherein:
the result of the determining whether any of the identified wavelengths meet a second wavelength requirement indicates that a first wavelength of the identified wavelengths meets the second wavelength requirement; and
the selecting the transmission wavelength based upon the result of the determining whether any of the identified wavelengths meet the second wavelength requirement comprises selecting the first wavelength as the transmission wavelength.

13. The method of claim 1, wherein:
the result of the determining whether any of the identified wavelengths meet a second wavelength requirement indicates that none of the identified wavelengths meets the second wavelength requirement; and
the selecting the transmission wavelength based upon the result of the determining whether any of the identified wavelengths meet the second wavelength requirement comprises selecting as the transmission wavelength one of the identified wavelengths for which one of a tunable wavelength direction-bound add/drop transponder and a tunable wavelength directionless add/drop transponder operable at said one of the identified wavelengths is available at each of the first node and the second node.

14. The method of claim 1, further comprising:
selecting a second path from the first node to a third node;
identifying a set of one or more wavelengths that can be used continuously across said second path; and
selecting a second transmission wavelength for said second path, wherein the selecting includes:
determining that one of the identified set of wavelengths meets the first wavelength requirement, wherein the first wavelength requirement is met for a wavelength when a fixed wavelength direction-bound add/drop transponder operable at said wavelength is available at each of the first node and the third node; and
responsive to said determining, selecting the one of the identified set of wavelengths as the second transmission wavelength.

15. A path computation engine of an optical communications network, the path computation engine being arranged to configure an optical path from a first node to a second node in an optical communications network, each node comprising a plurality of add/drop transponders comprising at least two of a fixed wavelength direction-bound add/drop transponder, a fixed wavelength directionless add/drop transponder, a tunable wavelength direction-bound add/drop transponder, and a tunable wavelength directionless add/drop transponder, the plurality of add/drop transponders each comprising an add and a drop, wherein the path computation engine is arranged to:
select a path from the first node to the second node;
identify each wavelength that may be used continuously across said path;
select as a transmission wavelength for said optical path, which includes:
determining that none of the identified wavelengths meet a first wavelength requirement, wherein the first wavelength requirement is met for a wavelength when a fixed wavelength direction-bound add/drop transponder operable at said wavelength is available at each of the first node and the second node;
responsive to said determining that none of the identified wavelengths meet the first wavelength requirement, determining whether any of the identified wavelengths meet a second wavelength requirement, wherein the second wavelength requirement is met for a wavelength when one of a fixed wavelength direction-bound add/drop transponder and a fixed wavelength directionless add/drop transponder operable at wavelength is available at each of the first node and the second node; and
selecting one of the identified wavelengths as the transmission wavelength based upon a result of the determining whether any of the identified wavelengths meet the second wavelength requirement.

16. An optical communications network node comprising:
a plurality of add/drop transponders comprising at least two of a fixed wavelength direction-bound add/drop transponder, a fixed wavelength directionless add/drop transponder, a tunable wavelength direction-bound add/drop transponder, and a tunable wavelength directionless add/drop transponder, the plurality of add/drop transponders each comprising an add and a drop; and
a controller arranged to:
select a path across an optical communications network from said optical communications network node to a second node comprising a second plurality of add/drop transponders comprising at least two of a fixed wavelength direction-bound add/drop transponder, a fixed wavelength directionless add/drop transponder, a tunable wavelength direction-bound add/drop transponder, and a tunable wavelength directionless add/drop transponder, the second plurality of add/drop transponders each comprising an add and a drop;
identify each wavelength that may be used continuously across said path; and
select a transmission wavelength for said path, which includes:
determining that none of the identified wavelengths meet a first wavelength requirement, wherein the first wavelength requirement is met for a wavelength when a fixed wavelength direction-bound add/drop transponder operable at said wavelength is available at each of the optical communications network node and the second node;
responsive to said determining that none of the identified wavelengths meet the first wavelength requirement, determining whether any of the identified wavelengths meet a second wavelength requirement, wherein the second wavelength requirement is met for a wavelength when one of a fixed wavelength direction-bound add/drop transponder and a fixed wavelength directionless add/drop transponder operable at said wavelength is available at each of the optical communications network node and the second node; and
selecting one of the identified wavelengths as the transmission wavelength based upon a result of the determining whether any of the identified wavelengths meet the second wavelength requirement.

* * * * *